United States Patent [19]

Austen et al.

[11] 4,282,277
[45] Aug. 4, 1981

[54] ORIENTED, SEMI-CRYSTALLINE POLYMER PRODUCT AND METHOD AND APPARATUS FOR PRODUCING SUCH PRODUCT

[75] Inventors: Alfred R. Austen, Center Valley; Darral V. Humphries, Allentown, both of Pa.

[73] Assignee: Bethlehem Steel Corporation, Bethlehem, Pa.

[21] Appl. No.: 72,807

[22] Filed: Sep. 5, 1979

Related U.S. Application Data

[63] Continuation-in-part of Ser. No. 941,116, Sep. 8, 1978.

[51] Int. Cl.$^3$ .................... B29C 23/00; F16L 9/12; B32B 27/06; B32B 27/32
[52] U.S. Cl. ........................ 428/36; 264/323; 264/570; 428/220; 428/474.4; 428/523; 428/524; 428/480; 428/910; 260/37 N; 260/37 R; 260/40 R; 260/40 P; 260/42.46; 526/348.1; 526/309; 526/323; 526/335; 526/270; 526/351
[58] Field of Search .............. 428/220, 523, 524, 480, 428/474.4, 36, 910; 526/348.1, 270, 309, 323, 335; 264/323, 570; 260/42.46, 40 P, 37 N

[56] References Cited

U.S. PATENT DOCUMENTS

| | | | |
|---|---|---|---|
| 3,174,320 | 1/1965 | Shaw | 264/176 R |
| 3,198,866 | 8/1965 | Covington, Jr. et al. | 264/297 |
| 3,205,290 | 9/1965 | Covington, Jr. et al. | 264/292 |
| 3,215,590 | 11/1965 | Purvis | 428/324 |
| 3,440,130 | 4/1969 | Telkes | 428/402 |
| 3,475,245 | 10/1969 | Bearer | 428/36 |
| 3,507,941 | 4/1970 | Kies et al. | 264/570 |
| 3,642,976 | 2/1972 | Buckley et al. | 264/323 |
| 3,767,757 | 10/1973 | Vroom et al. | 264/570 |
| 3,784,660 | 1/1974 | Hardy | 264/570 |
| 3,896,200 | 7/1975 | Wiley et al. | 264/532 |
| 3,907,961 | 9/1975 | Carrow | 264/166 |
| 3,923,943 | 12/1975 | Iriko et al. | 264/532 |
| 3,929,959 | 12/1975 | Findlay et al. | 264/292 |
| 4,002,709 | 1/1977 | Mozer | 264/532 |
| 4,042,747 | 8/1977 | Breton et al. | 428/402 |
| 4,056,591 | 11/1977 | Goettler et al. | 264/177 R |

OTHER PUBLICATIONS

Bigg, D. M., "*Hydrostatic Extrusion of Semi-Crystalline Polymers for Superior Tensile Properties*", Plastics Design & Processing, Feb. 1979, pp. 21–28.
Friedrich, K., "Microscopic Methods for Structural Analysis of Partially Crystalline Thermoplastics", *Praktische Metallographie*, 16(1979), pp. 321–334.
Alfrey, T., Jr., "Effects of Processing Variables on Structure and Performance of Thermoplastic Polymers", *Science and Technology of Polymer Processing*, The MIT Press, Cambridge, Mass., Aug. 1977, pp. 185–199.

*Primary Examiner*—William R. Dixon, Jr.
*Attorney, Agent, or Firm*—Joseph J. O'Keefe; Charles A. Wilkinson; John S. Simitz

[57] ABSTRACT

A thick-walled, seamless, rigid conduit having a substantially uniform wall thickness which is not less than about 0.5 percent of the outside diameter consisting essentially of an oriented crystalline thermoplastic polymer characterized by a structure comprised of radially compressed discrete, platelet-like spherulitic crystalline aggregates and having a combination of good ultimate tensile strength and low temperature tensile impact strength is described.

The conduit is fabricated by solid state hydrostatic extrusion of a substantially non-oriented semi-crystalline thermoplastic polymer preform which may contain up to about 60 weight percent filler. The polymer is substantially simultaneously elongated in both circumferential and axial directions by compressive forces with the circumferential elongation being at least 100 percent.

The apparatus used to produce the product is a hydrostatic extrusion press which includes an annular orifice in which the thermoplastic polymer is elongated substantially simultaneously circumferentially and axially with the circumferential elongation being at least 100 percent. Means for maintaining the rigidity of tooling and the hydrostatic extrusion fluid pressure while providing a film of the fluid on the preform for lubricity are provided in the apparatus.

A sheet substantially uniform in thickness and having substantially the microstructure and properties of the conduit and excellent drawability may be made from the conduit.

An article of manufacture may be made by solid state deformation processing of the conduit or the sheet.

65 Claims, 12 Drawing Figures

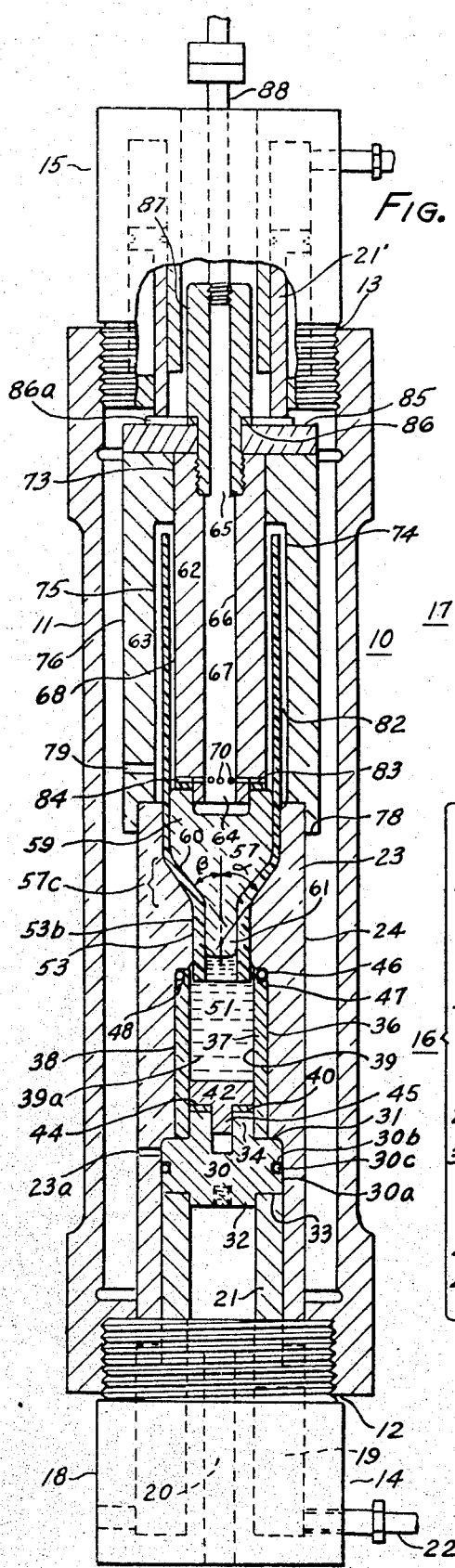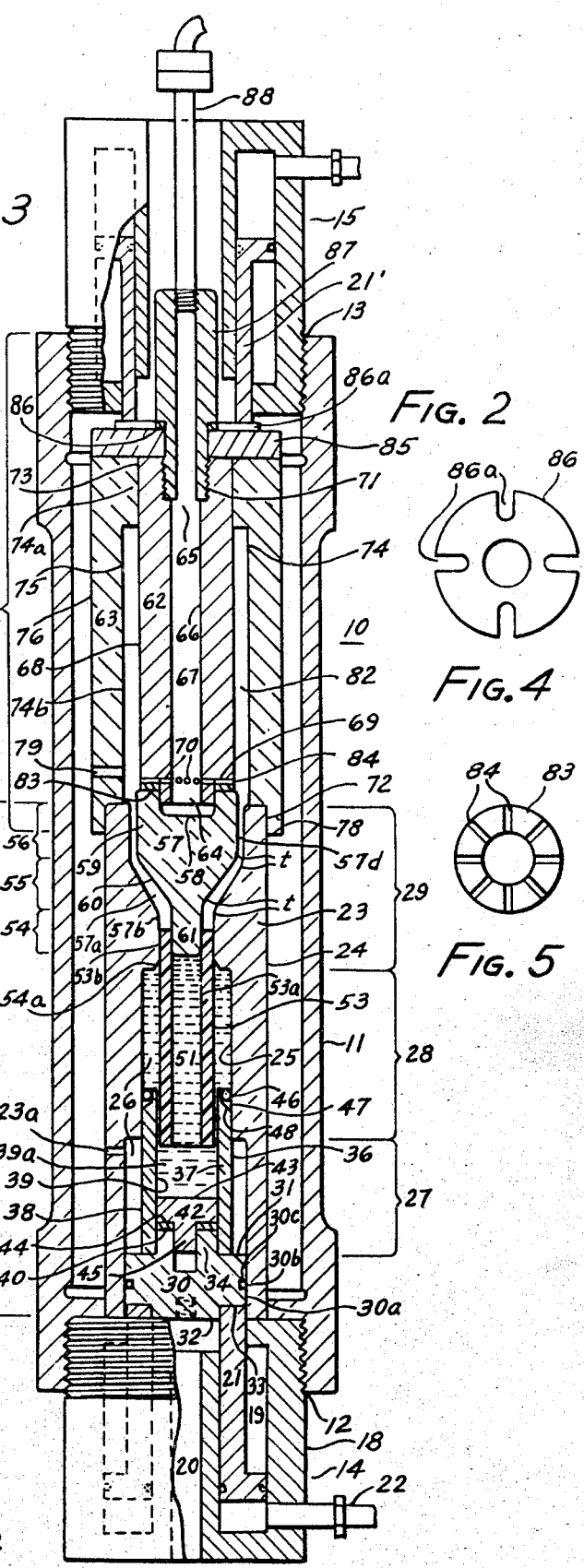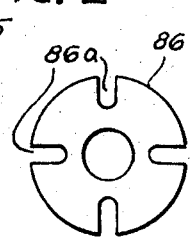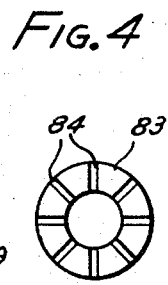

ORIENTED, SEMI-CRYSTALLINE POLYMER PRODUCT AND METHOD AND APPARATUS FOR PRODUCING SUCH PRODUCT

CROSS-REFERENCES OF THE INVENTION

This is a continuation-in-part of U.S. application Ser. No. 941,116 filed Sept. 8, 1978 entitled "An Oriented, Crystalline Polymer Product and Method and Apparatus for Producing Such Product" in the names of Alfred R. Austen and Darral V. Humpries.

BACKGROUND OF THE INVENTION

This invention relates to a thick-walled, seamless, rigid conduit consisting essentially of an oriented crystalline thermoplastic polymer having improved properties; to a sheet made therefrom and to an article of manufacture made from the conduit or sheet.

The conduit is fabricated by solid state hydrostatic extrusion of the polymer in an apparatus including an annular orifice having a diametrically diverging geometry and converging walls and orifice area whereby the polymer is substantially simultaneously elongated circumferentially and axially.

It is well known that the physical and mechanical properties of semi-crystalline thermoplastic polymers can be improved by orienting their structures. Polymer processing methods, such as drawing, blow molding, injection molding and the like have all been used to fabricate articles of thermoplastic polymers having oriented structures.

In recent years, extensive study has been directed to methods of deforming the thermoplastic polymers in a solid state. In these methods, the polymer is mechanically deformed to obtain a desired uniaxial or biaxial molecular orientation. The polymer may be drawn, extruded or processed at temperatures within the range from the glass transition temperature to temperatures just below the crystalline melt temperatures of the polymers. In the case of stereoregular polypropylene, the polymer may be processed at temperatures as low as 0 C. (32 F.). Products such as strip, tubes, rods and shapes, usually having predominantly unidirectional orientation, have been fabricated by such processing methods. The extrusion methods and apparatus used for processing the polymers are similar to those used in the metal industry. Short tubular articles with high axial elongation and low circumferential elongation, for example shotgun shells, have been produced by solid state extrusion.

One method for processing a polymer is described by Robert A. Covington, Jr. et al in U.S. Pat. No. 3,205,290 entitled "Method of Making Tubing for Cartridge Casings and the Like." In the method, a molten polymer, for example polyethylene or polypropylene, is formed into a thick-walled tubular preform or billet. The billet is processed in a two-step process into a short, thick-walled tubular article having one closed end. Initially, the billet is expanded circumferentially by an average of about 40 to 50 percent by forcing it onto a solid mandrel. Circumferential elongation refers to the expansion of the median circumference of the billet. The expanded billet on the solid mandrel is then forced through a drawing die to elongate the expanded billet in an axial direction while the circumferential elongation remains constant. The axial elongation can be as much as 350 percent resulting in a predominantly axial orientation.

The Covington et al method does not allow a circumferential expansion of at least 100 percent. If such large circumferential expansions were attempted, the billet would buckle or collapse in an effort to push it over the mandrel. If large circumferential deformations of 100 percent or more could be made by Covington et al, the deformations would be tensile in nature because the billet would be drawn over the mandrel. Drawing the billet over the mandrel would result in non-homogeneous deformation of the polymer structure.

U.S. Pat. No. 3,198,866 to R. A. Covington et al entitled "Method and Apparatus for producing Plastic Tubular Members" is directed to a continuous method for producing tubular members. In the method, thick-walled, bored slugs of a thermoplastic polymer, polyethylene having a crystallinity of 60 to 85 percent, are forced over a mandrel by ram pressure.

The patent contends that the molecular structure of the polymer is oriented both longitudinally and transversely. However, the apparatus of Covington et al is designed to prevent any significant increase in the outside diameter of the slug, i.e. the polymer is not expanded circumferentially into a conduit having a larger outside diameter than the outside diameter of the slug. Since, the slug is increased in length and the wall thickness is decreased but the outside diameter is not increased, the polymer is highly oriented in the longitudinal direction but is not highly oriented in the circumferential direction. There is little median circumferential elongation therefore there is little, if any, improvement of the average properties in the circumferential direction.

Another process used to produce oriented shotshells is described by Donald Urquhart Findlay et al in U.S. Pat. No. 3,929,960 entitled "Method for Producing Oriented Plastic Shotshells." The method is directed to making an oriented polyolefinic shotshell with an axial tensile strength between about 1400 and 2100 kilograms of force per square centimeter (20,000 and 30,000 pounds per square inch) and a circumferential tensile strength between about 387 and 600 kilograms of force per square centimeter (5,500 and 8,500 pounds per square inch). A polyolefinic blank which is 2.54 centimeters (1 inch) in length and having a wall thickness of 1.06 centimeters (0.42 inch) is heated to a temperature between 27 C. and 115 C. (80 F. and 240 F.) and is placed on a solid movable mandrel. The blank is moved into a die cavity. A ram forces the blank over the mandrel in a back extrusion to reduce the blank wall with very little, if any, expansion of the outside diameter of the blank.

The method of Findlay et al limits the circumferential expansion of the polymer, hence limits the circumferential deformation of the polymer structure. Since the axial elongation is high, the molecular structure is highly oriented in the axial direction. The structure, comprised of spherulitic crystalline aggregates, is highly elongated axially but with very little elongation circumferentially. The structure, therefore, is not comprised of platelet or wafer-like, radially compressed spherulitic crystalline aggregates nor are the circumferential properties improved significantly.

The indirect extrusion method of Findlay et al limits the expansion of the outside diameter of the blank to below 25 percent which is well below the minimum circumferential expansion achieved in the method of the invention hereinafter described.

As noted by Robert Shaw in U.S. Pat. No. 3,714,320 entitled "Cold Extrusion Process", polymers, particularly stereoregular polypropylene, can be fabricated by various methods such as rolling, forging, swaging and peening at temperatures below the crystalline melt temperature. Shaw teaches that cold extrusion of polymers has limited application because excessive heat is generated during large deformations thereby increasing the temperature of the polymer to its melting temperature. Shaw attempts to overcome the problem of extruding polymers by cooling them to temperatures as low as 0 C. (32 F.). If necessary, the extrusion apparatus can also be cooled to low temperatures. Forward extrusion results in the conversion of rod-like shapes into rod-like extrudates of various cross-sectional shapes having a generally reduced cross-sectional area. It is apparent that Shaw does not envision making circumferentially elongated pipes and conduit by extrusion since he teaches that tubes or pipes may be formed by a known manner similar to the so-called Mannesmann method in which a mandrel is placed inside a tube and a rolling or hammering force is applied to the outside surface. Back extrusion can be used to produce cuplike shapes.

Shaw's teaching is diametrically opposed to an extrusion process in which a thermoplastic polymer is heated to a temperature which is between its 4.64 kilograms force per square centimeter (66 pounds per square inch) heat deflection temperature and its crystalline melt temperature for extrusion through a die configuration which will substantially simultaneously elongate the polymer circumferentially and axially.

In the limited application of Shaw's process to extrusion in which he teaches that the polymer must be cooled to low temperatures, it would require excessively high pressures, on the order of 10 times as great as those required to warm extrude the polymer, in order to extrude the cooled polymer into a tube comprised of highly oriented polymer. The use of excessively high pressures applied to a relatively strong material would result in stick-slip, high strain rate, high energy extrusion and periodic generation of high temperatures at which the polymer would melt. When a polymer melts, the crystallinity and orientation in the polymer are adversely affected and the product is damaged beyond use. Therefore, a polymer processed according to Shaw could not possibly have a structure comprised of platelet or wafer-like, radially compressed spherulitic crystalline aggregates oriented both circumferentially and axially and having improved circumferential properties.

The use of the Mannesmann method wherein a hammering or rolling pressure is applied locally to the surface of a tube or a mandrel to produce an elongated tube would not produce homogeneously deformed spherulitic crystalline aggregates, since large localized shear strain gradients would be induced in the polymer resulting in non-homogeneous deformation of the spherulites. Non-homogeneous deformation results in damage to the spherulitic crystalline aggregates and to the formation of microvids and the enlargement of existing microvoids. The density of a polymer so worked is less than the density of the original billet. This non-homogeneous deformation would also adversely affect the low temperature tensile impact strength and the density related properties of the polymer.

Long, thick-walled high strength tubular polymer products, such as high pressure hoses, tubes and pipes have been produced by plasticating extrusion of fiber reinforced plastics and medium pressure tubes by plasticating extrusion methods.

One such method for producing medium pressure thermoplastic pipe having a diameter as large as 152.4 centimeters (60 inches) and a wall thickness of over 5.08 centimeters (2 inches) is described in U.S. Pat. No. 3,907,961 to Guy E. Carrow entitled "Flexible Cylinder for Cooling an Extruded Pipe." The pipe can be made by either screw extrusion or impact extrusion. In either case, the thermoplastic polymer is heated to a molten state and is extruded through a conical shape passage onto a flexible mandrel. A cooling medium is provided to cool the surfaces of the pipe to a solidified state. The polymer is extruded in the molten state and the resultant pipe has an unoriented structure.

A method for producing high pressure pipe is described in U.S. Pat. No. 4,056,591 to Lloyd A. Goettler et al which is directed to a process for controlling the orientation of discontinuous fiber in a fiber reinforced product produced by melt or plasticating extrusion. The fiber-filled matrix is extruded through a diverging die having a generally constant channel. The walls of the die may taper slightly so that the area of the outlet of the die is larger than the area of the inlet of the die. The amount of orientation of the fibers in the hoop direction is directly related to the area expansion of the channel from the inlet to the outlet of the channel. The product produced is a reinforced hose containing fibers which are oriented in the circumferential direction to improve the circumferential properties. While the fibers may be oriented, the polymer is unoriented since it is processed in a molten state.

Since the fiber reinforced polymer is processed in a molten state, the structure is not comprised of platelet or wafer-like, radially compressed spherulitic crystalline aggregates highly oriented both circumferentially and axially, although the fibers added to the polymer may be oriented circumferentially.

Biaxially oriented containers, such as bottles used in the soft drink industry are made by a melt extrusion-stretching or injection molding-blowing expanding process.

One such process in which a biaxially oriented hollow article having good transparency and strength and made from polypropylene is processed by the method described in U.S. Pat. No. 3,923,943 to Fumio Iriko et al entitled "Method for Molding Synthetic Resin Hollow Articles." In the method, the initial step is the production of a parison by injection molding. The parison is expanded by stretching in contradistinction to being expanded by compressive forces therefore the structure is non-homogeneously deformed and is susceptible to the formation of microvoids thereby decreasing the density of the polymer typically about 0.5 percent.

A second method employed to produce a biaxially oriented container is described by Fred E. Wiley et al in U.S. Pat. No. 3,896,200 entitled "Method of Molding Biaxially Oriented Hollow Articles." A parison is held in constant tension and is stretched in the axial direction before or as it is expanded radially into a cavity.

Still another method for producing containers which have clarity is described in U.S. Pat. No. 4,002,709 to Larry P. Mozer entitled "Controlled Air in Polyester Tube Extrusion for Clear Sealable Parison." In the process a polyester, for example polyethylene terephthalate, is melt extruded into a clear thick-walled tubing which is then heated and blown into a container.

The polyester is in an amorphous state as evidenced by the clarity of the tubing.

The containers in the above processes are produced by stretching the polymer, typically over 250 percent. Such large stretching deformations result in non-homogeneous deformation of the structure thereby damaging the spherulitic crystalline aggregates, causing the formation of microvoids and the enlargement of microvoids already present in the polymer. The density of the polymer is decreased and the microstructural sensitive properties, such as stress whitening and low temperature brittleness are not eliminated.

It is desired to provide a deformation method which is compressive in nature whereby the problems of non-homogeneous deformation and the associated defects are suppressed and an oriented spherulitic crystalline aggregate structure substantially free from such defects is produced.

The prior art processes described above, by which tubular products consisting essentially of thermoplastic polymers are produced are incapable of and cannot be adapted to expand a polymer by at least 100 percent in the circumferential direction in a compression-type deformation. Prior art processes for producing hoses or elongated tubular products are directed to melt or plasticating extrusion processes which result in the production of non-oriented products. Prior art processes for producing large diameter containers are directed to stretching or tensioning processes in which a polymer is expanded at least 100 percent in the circumferential direction. Stretching or tensioning causes non-homogeneous deformation of the spherulitic crystalline aggregates in the polymer structure. The spherulites are ruptured and tilted. Microvoids, microfibrils and eventually fibrils are formed. Defects, such as microvoids already present in the polymer are enlarged. The resulting products are highly oriented in a circumferential direction, but have defects formed in the structure. None of the prior art processes described above produces a conduit consisting essentially of a crystalline thermoplastic polymer which is expanded at least 100 percent in the circumferential direction and is expanded at least 50 percent in the axial direction and has a structure consisting essentially of discrete platelet or wafer-like, radially compressed spherulitic crystalline aggregates which are oriented in both the circumferential and axial directions, which is substantially devoid of process induced defects, such as microvoids and has a density which is the same as or higher than the same polymer processed into a conduit by prior art processes and which has improved circumferential tensile impact strength and is less susceptible to further microstructural damage on subsequent stretching.

Neither do the prior art references produce a sheet from a conduit, which sheet retains the unique morphology and properties of the conduit, nor an article of manufacture which is made from the conduit or sheet, which article will retain the microstructure and properties of the conduit or sheet in at least a portion thereof.

The prior art references also do not produce a conduit, sheet or article of manufacture from a substantially non-oriented semi-crystalline thermoplastic polymer which contains a filler and which has a matrix comprised of the unique oriented microstructure and properties hereinafter described.

It is an object of this invention to provide a conduit consisting essentially of a crystalline thermoplastic polymer which is substantially free of defects caused by non-homogeneous deformation of the polymer, is oriented in both a circumferential direction and an axial direction, and has particularly improved circumferential tensile impact strength over the ambient to low temperature range, and retains the density of the polymer from which it is processed.

It is a further object of this invention to provide a commercially feasible process by which said conduit is produced from a substantially non-oriented semi-crystalline thermoplastic polymer.

It is a further object of this invention to produce a sheet from the conduit by solid state heat-flattening techniques and which is characterized by retaining substantially the same morphology and properties of the conduit and having a substantially uniform thickness and excellent formability.

It is a further object of this invention to produce an article of manufacture from the conduit or sheet by known solid state processing techniques whereby the article will retain the unique morphology and properties of the conduit or sheet in at least a portion therefore.

Other objects of this invention will appear more clearly from the following detailed description and drawings.

SUMMARY OF THE INVENTION

In accordance with this invention, there is provided a thick-walled, seamless, rigid conduit having a wall thickness from about 0.5 percent to about 6.25 percent of the outside diameter, consisting essentially of an oriented crystalline thermoplastic polymer characterized by a density which is at least equal to the density of the unoriented polymer and by a memory urging the polymer back to its unoriented state when subjected to heating in an unconstrained state for a time just below its crystalline melt temperature. The polymer has a structure which is substantially free from process induced defects and is comprised of discrete, platelet or wafer-like, radially compressed spherulitic crystalline aggregates which are oriented in the plane of the conduit wall. The circumferential ultimate tensile strength of the conduit is at least one and three quarters as great as that of the polymer in a substantially non-oriented state and the circumferential tensile impact strength is at least five times as great as that of the polymer in the substantially non-oriented state at 24C (75F). The polymer retains at least 20 percent of such circumferential tensile impact strength at $-45C$ ($-50F$). The ratio of the tensile impact strength (TIS) to the ultimate tensile strength (UTS) as determined by ASTM D1822 S-type specimens is at least 50% greater than that ratio determined for the same polymer composition which is biaxially oriented to the same ultimate tensile strength level by conventional solid state deformation processes, for example blow molding or thermoforming or tentering. The conduit is less susceptible to microstructural damage on subsequent solid state deformation processing than conduits comprised of non-oriented thermoplastic polymers.

In a second embodiment of the invention, a conduit of this invention in which the circumferential and axial orientations are substantially equal is slit and heat flattened under pressure to produce sheet is formable at temperatures below the crystalline melt temperature, i.e., in a solid state by methods, such as hot stamping, thermoforming, pressing and the like, into usable products such as luggage, automotive hoods, trunk lids, front panels and the like. Such sheets retain the morphology and properties of the conduit and are less permeable than oriented sheets prepared by conventional drawing and stretching process.

In a third embodiment, a conduit of this invention is prepared from a filled semi-crystalline thermoplastic homopolymer, for example isotactic polypropylene. The conduit is slit and heat flattened to produce a filled polymer sheet having a matrix comprised of an oriented microstructure.

In a fourth embodiment of the invention the filled oriented sheet can be processed by solid state processes into articles of manufacture such as refrigerator accessories, such as door liners, chiller trays, vegetable and fruit trays, gaskets; automotive parts, such as hoods, and trunk lids; deep containers, such as garbage pails, storage drums, water buckets; luggage, etc.

The conduit of the invention is produced by solid state hydrostatic extrusion of a substantially non-oriented semi-crystalline thermoplastic polymer. The polymer is preferably heated to a temperature which is in a range between about its 4.64 kilograms of force per square centimeter (66 pounds per square inch) deflection temperature and 8 C. (14 F.) below the crystalline melt temperature. Sufficient pressure is applied through a hydrostatic fluid to extrude the polymer through an annular orifice having converging walls, a converging cross-sectional area and a diametrically diverging geometry. The polymer is elongated substantially simultaneously in both the circumferential and axial directions. The pressure required for extrusion is maintained in the fluid by a sealing means which allows a thin film of the fluid to be extruded with the preform and to act as a lubricant for the polymer during extrusion. The extrudate is lubricated and cooled by a second fluid as it passes over a mandrel surface. Cooling fixes the polymer and reduces the inherent tendency of the polymer to spring back and recover its shape.

The polymer is extruded in a hydrostatic extrusion press. The press is comprised of a hydraulic pressurizing means coacting with a container assembly and an extrudate receiving assembly. A die and a mandrel-head positioned in the container assembly form an annular orifice through which the polymer is extruded. The mandrel-head is contiguous and aligned with a mandrel in the extrudate receiving assembly. A pressurized force sufficient to extrude the thermoplastic polymer is applied to a polymer preform by a pressurizing means. The sealing means in the container assembly prevents leakage of hydrostatic fluid thereby maintaining extrusion pressure in the fluid while allowing a film of the fluid to be extruded with the preform to provide lubricity during extrusion. The annular orifice has an axially aligned inlet or sealing zone, an expanding and elongating zone having converging walls, a converging cross-sectional area and a diametrically diverging geometry and an outlet or sizing zone. The sizing zone is smaller in cross-sectional area and has larger outside and inside diameters than the sealing zone.

The polymer is extruded into an extrudate receiving assembly axially aligned and contiguous with the container assembly. The mandrel in the extrudate containing assembly is contiguous and aligned with the base of the mandrel-head. A clamping force is applied to the mandrel to provide rigidity to the apparatus and to prevent lateral and axial movement of the mandrel-head during extrusion. Means for introducing and exhausting a lubricating and/or cooling fluid into the extrudate containing assembly are also provided.

FIGURES OF THE INVENTION

FIG. 2 is an elevation view in cross-section of a vertical batch extrusion apparatus, which may be used in the method of the invention, showing a substantially non-oriented semi-crystalline heated thermoplastic polymer preform in position at the start of the hydrostatic extrusion process.

FIG. 3 shows the apparatus of FIG. 2 after the preform has been extruded.

FIG. 4 is a top view of a slotted washer used in the apparatus of the invention.

FIG. 5 is a top view of a grooved washer used in the apparatus of the invention.

PREFERRED EMBODIMENT OF THE INVENTION

Figure 1:
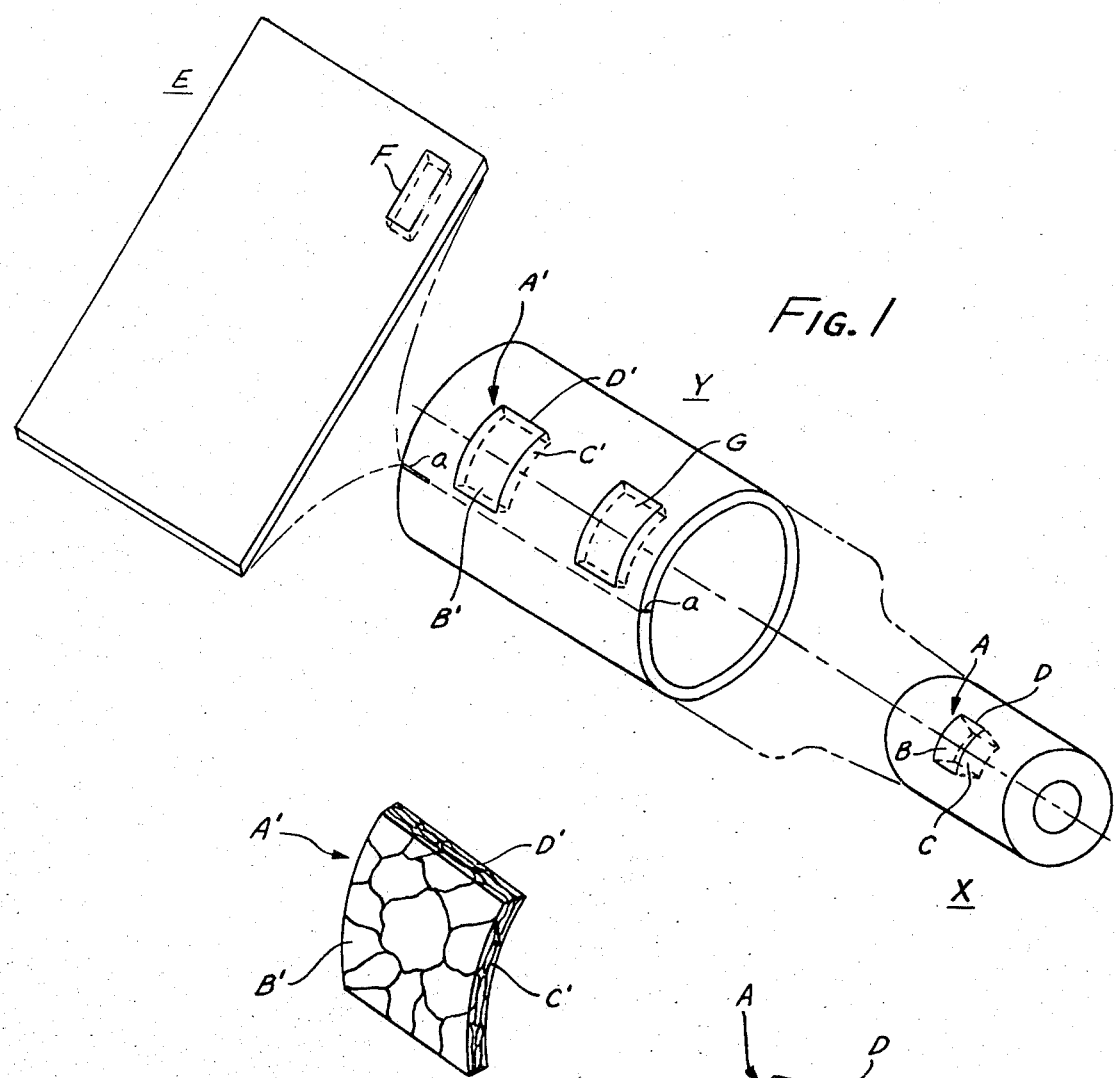
FIG. 1 is a diagrammatic representation of the extrusion of a thermoplastic polymer preform into a conduit and the formation of a sheet product from the conduit and showing a pictorial representation of the structure formed in the preform and the conduit.

This invention is directed to an oriented crystalline thermoplastic polymer product produced by solid state deformation processes of a substantially non-oriented semi-crystalline thermoplastic polymer which may contain up to 60 weight percent additive. The final product may be a conduit, a sheet or an article of manufacture made by solid state deformation processing of the conduit or sheet. At least a portion of the final product is characterized by having a microstructure comprised of spherulitic crystalline aggregates which are compressed transversely to the plane of the product and are biaxially oriented in the plane of the product. The product is substantially devoid of any process induced microvoids and microfibrils. The product is also characterized by having in at least a portion thereof an improved combination of tensile impact strength and ultimate tensile strength at ambient and low temperatures; the ratio of the tensile impact strength to ultimate tensile strength (TIS/UTS) being at least 50 percent greater than that ratio determined for the same polymer composition which is biaxially oriented to the same ultimate tensile strength level by conventional solid state deformation processes, for example blow molding. The tensile impact strength in at least a portion of the product is at least 5 times greater and the ultimate tensile strength is at least 1¾ times greater than that of the unoriented polymer from which the product is made. The product retains at least the same density as the unoriented polymer and is less permeable than a product made by conventional solid state tensioning processes, such as blow molding from the same polymer composition.

The product or products are made by initially extruding a substantially non-oriented semi-crystalline thermoplastic polymer preform in the solid state with a hydrostatic fluid through an extrusion zone at a temperature which is between the 4.64 kilograms force per square centimeter heat deflection temperature, i.e. maximum use temperature, and 8C below the crystalline melt temperature of the thermoplastic polymer while expanding the preform substantially simultaneously circumferentially at least 100 percent and axially at least 50 percent. The resulting product or intermediate tubular or conduit type product has a substantially uniform wall thickness which is about 0.5 to 6.5 percent of the outside diameter with an actual thickness of not less than 0.079 centimeter in conduits having an outside diameter of between 2.54 centimeters and 152.0 centimeters and consists of at least one oriented crystalline thermoplastic polymer characterized by a density which is at least equal to the density of the unoriented polymer and a microstructure substantially devoid of any microvoids and microfibrils induced during processing and comprised of radially compressed, discrete, platelet-like spherulitic crystalline aggregates which are oriented in the plane of the conduit, the conduit having a tensile impact strength at $-45$ C. which is not less than 20 percent of its tensile impact strength at 24 C. and having a tensile impact strength at 24 C. which is at least five times and a circumferential ultimate tensile strength which is at least one and three quarters that of the corresponding conduit of the same polymer in the unoriented state.

The oriented semi-crystalline thermoplastic conduit may contain up to about 60 weight percent filler material. It has in the past been very difficult, if not impossible, to orient thermoplastic material which contains substantial filling material. However, when the thermoplastic polymer contains a filler and is extruded in accordance with the present invention it is found that the thermoplastic polymer can be successfully oriented as described above and will have a structure unlike previous products substantially devoid of microvoids and microfibrils and having within the thermoplastic polymer discrete, platelet-like spherulitic crystalline aggregates oriented in the plane of the conduit.

After the tubular or conduit product of the invention is made the product can be used as a conduit or structural member or the like, but more frequently will be split and heat flattened in a solid state into a sheet product. The amount of heat used in flattening is insufficient to affect the properties or microstructure of the oriented thermoplastic polymer and the sheet product thus has the same superior properties as the conduit.

The sheet product in turn can be used as is for structural or the like purposes, or other uses, but will in many cases be used as a blank to form a final product such as, for example, a solid state formed product. Many solid state formed products are so called stretch formed products where the thermoplastic polymer is formed in a die under sufficient heat and pressure to deform the thermoplastic polymer in a solid state. The properties of the final solid state stretch-formed product will depend primarily upon the extent of deformation. However, it has been found that solid state stretch formed products made from the oriented sheet blanks of the invention have superior properties compared with the properties of similar products made with unoriented thermoplastic polymer. For example, stretch formed products made from the oriented thermoplastic polymer sheet blanks of the invention will have a more uniform cross section. The superior properties of the oriented thermoplastic polymer prevent the thermoplastic polymer from "necking" down appreciably and the resulting product is thus much more uniformly stiff and strong than would otherwise be the case. The actual properties of the stretch formed product may vary from place to place in the product depending upon the amount of work or deformation applied to any given portion of the product. Any flanges on the product, being substantially unworked, will have the same superior characteristic properties as the original oriented blank. In some products this is very important as the flanges provide important structural strength and toughness. The lips or flanges around the edges of refrigerator freezer door liners, freezer food containers, pans or tote boxes are representative of this type of product. Likewise any portion of the product which is expanded less than roughly 50% will have essentially the same property characteristics as the original oriented blank material. Thus the properties of shallow drawn or formed articles are very superior. Beyond about 50% expansion the characteristic properties of the thermoplastic polymer are progressively changed due to the progressive destruction of the spherulitic crystalline aggregates and the increase in planar orientation as deformation continues. Initially, an increase in deformation increases the ultimate tensile strength while retaining at least the same tensile impact properties but at high elongation the properties begin to decrease. Therefore, products made from the oriented blanks of the invention will usually have very significant portions which have very superior properties compared to products made from an unoriented thermoplastic polymer, filled or unfilled, of the same composition.

In a detailed description of the invention, the product is a thick-walled, seamless, conduit (a conduit is a cylindrical member indeterminate in length and includes such forms as a tube, pipe and the like) consisting essentially of an oriented crystalline thermoplastic polymer. The conduit can have an outside diameter between about 2.54 centimeters (1 inch) to 152 centimeters (60 inches), however a preferred range is about 5 centimeters (2 inches) to 63.5 centimeters (24 inches) and the most preferred range is about 20 centimeters (8 inches) to 41 centimeters (16 inches). The thickness of the wall is substantially uniform radially and circumferentially from end to end and will not vary by more than plus or minus 10 percent, and preferably by not more than plus or minus 5 percent and most preferably not more than plus or minus 2.5 percent. The thickness of the wall is about 0.5 percent to about 6.25 percent, preferably about 1.0 to 3.0 percent and most preferably about 1.0 to 2.0 percent, of the outside diameter. However, in conduits which have an outside diameter of 2.54 to 7.62 centimeters (1 to 3 inches), the wall thickness is at least 0.074 centimeters (1/32 of an inch). The conduit may be as short as about 7.6 centimeters (3 inches) and as long as commercially practical and dictated by machine limitations, however it is preferred to make a conduit which is between about 30 centimeters (12 inches) and 244 centimeters (96 inches). The conduit is dimensionally stable and has at least about one and three quarters the circumferential ultimate tensile strength and not less than five times the circumferential tensile impact strength at 24 C. (75 F.) of a similar conduit made from the same substantially non-oriented semi-crystalline thermoplastic polymer by conventional methods. The conduit retains at least 20 percent of the room temperature tensile impact strength at $-45$ C. ($-50$ F.).

The structure of the conduit is comprised of spherulitic crystalline aggregates which are discrete and platelet or wafer-like and have a generally polygonal shape. The aggregates are radially compressed and circumferentially and axially elongated and are planar oriented, that is, are oriented in the plane of the conduit wall. The structure is substantially free of press induced microvoids and microfibrils in the boundaries between the spherulitic crystalline aggregates and in the spherulitic crystalline aggregates.

The starting thermoplastic polymer which can be used in this invention is a substantially non-oriented semi-crystalline or crystalline homopolymer or copolymer having a crystallinity of at least 45 percent, a relatively sharp crystalline melting point observed by differential thermal analysis and having a structure containing long chain molecules which solidify in the form of spherulitic crystalline aggregates. The polymer can be softened and formed by heat or stress and can be molecularly oriented by drawing and stretching at a temperature between the glass transition temperature and the crystalline melting point as shown by major improvements in properties, such as ultimate tensile strength and tensile impact strength. The polymer can have a molecular weight between $10^4$ and $10^6$. Such thermoplastic polymers include orientable polyolefins, for example isotactic polypropylene, high density polyethylene; polyamides, for example nylon 6,6; polyacetals, for example polyoxymethylene; polyesters, for example polybutylene terephthalate; and polycarbonates.

By way of example only, a typical structure of a polymer, which in this instance is isotactic polypropylene, processed by the method of the invention and the structure of the starting polymer preform are shown pictorially in FIG. 1. Test coupons A in FIG. 1A and A' in FIG. 1B were cut from the preform X and conduit Y, respectively, as shown. The outer surfaces B and B', and transverse surfaces C and C' and D and D' were polished and etched and were examined at a magnification of 100x by light optical microscopy. The surfaces were polished in a two-step sequence using a first paste containing 0.6 micron diamond dust and a second aqueous paste containing 0.3 micron aluminum oxide particles. The surfaces were carefully cleaned of any paste residue and were etched in a solution containing equal parts of benzene, xylene and chloroform heated to a temperature of about 80 C. (175 F.). It required three to four minutes to etch the surfaces of coupon A and five to six minutes to etch the surfaces of coupon A'. The surfaces B, C and D of coupon A were found to be comprised of substantially non-oriented spherulitic crystalline aggregates as shown. It is generally recognized that the crystalline aggregates grow radially from nuclei and are referred to as spherulites. The spherulitic crystalline aggregates appear as generally polygonal in shape on polished faces. While the structure of the polymer is predominantly crystalline in nature, small areas of non-crystalline or amorphous structures become entrapped in and between the spherulites during their growth.

The surface B' shows a structure comprised of spherulitic crystalline aggregates which are discrete platelets generally polygonal in shape. The surfaces C' and D' show the aggregates to be radially compressed into relatively thin lamellae elongated in both the circumferential and axial directions and oriented in the plane of the conduit wall, i.e. oriented circumferentially and axially. No evidence of microvoids or enlargement of existing microvoids was seen in the conduit.

A coupon of the conduit Y material was notched with a sharp knife blade on two transverse surfaces perpendicularly to the plane of the conduit. The material was then torn circumferentially and axially. Microscopic examination of the tear surfaces at 100 magnifications showed what appeared to be radially compressed platelet or wafer-like spherulitic crystalline aggregates arranged in an overlapping pattern.

The sheet product E was formed by slitting the conduit Y along line a—a as shown in FIG. 1. The slit conduit was heat flattened under pressure at about 129 C. (265 F.) for five minutes. A test coupon F was cut from the sheet, polished and etched and examined as described above. The microstructure appeared to be identical to the microstructure of the conduit.

Figure 1B:
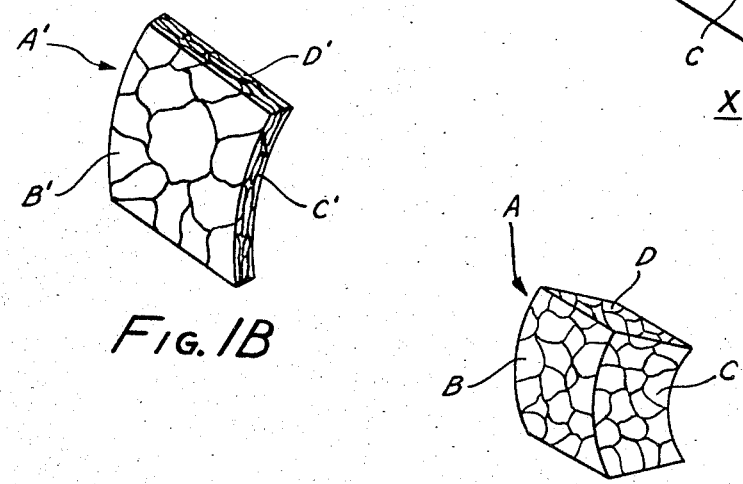
FIG. 1B is a test coupon cut from the conduit shown in FIG. 1.
Figure 1A:
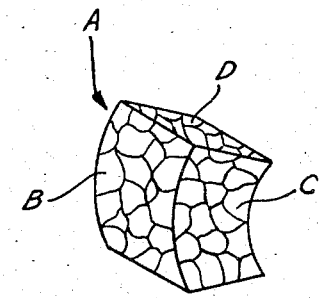
FIG. 1A is a test coupon cut from the thermoplastic polymer preform shown in FIG. 1.
Figure 9:
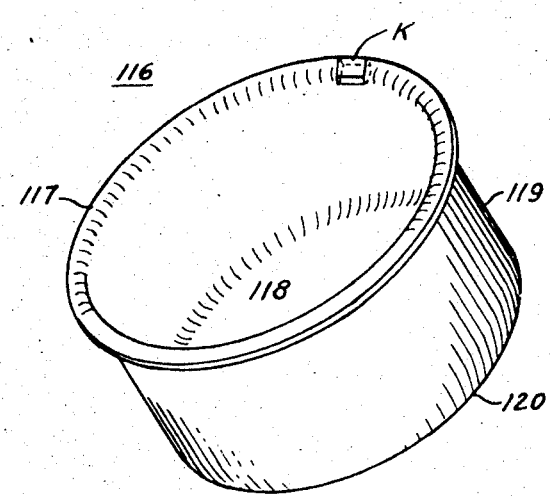
FIG. 9 is an isometric view of a frozen food container made from the sheet of the invention.
Figure 10:
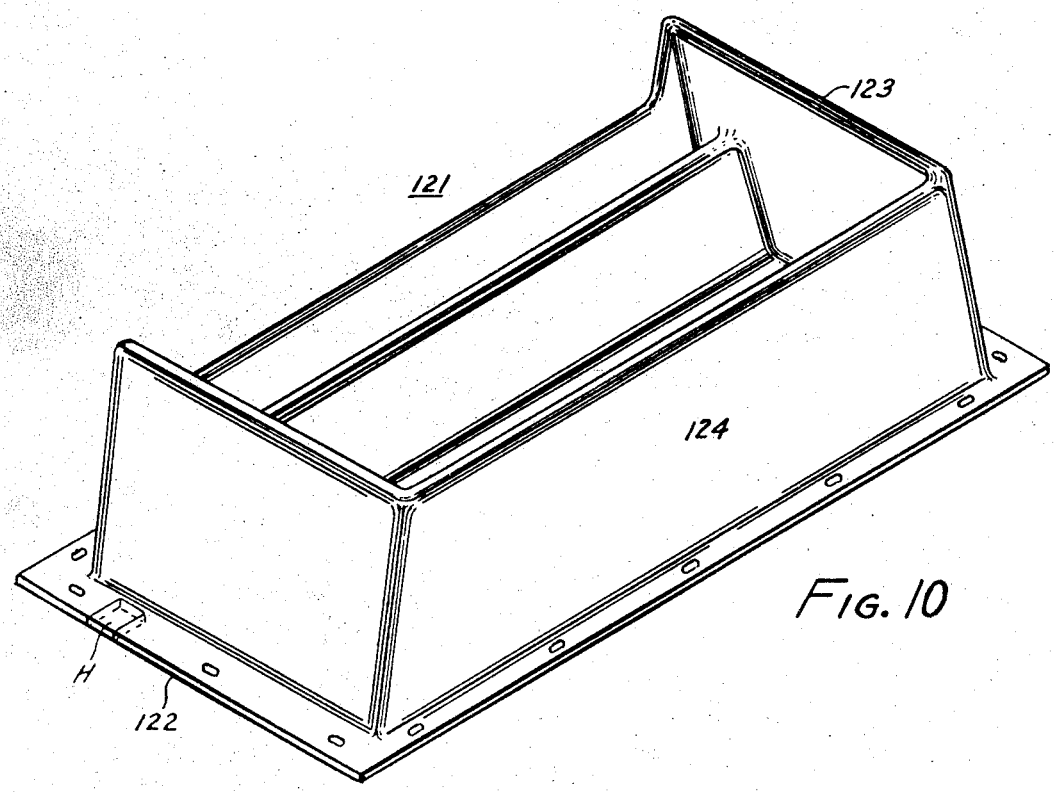
FIG. 10 is an isometric view of a refrigerator door liner which can be made from a sheet of the invention.

Coupons K and H cut from the heavy wall flange areas of the freezer food container, FIG. 9, and refrigerator freezer door liner, FIG. 10 respectively, have microstructures comprised of radially compressed discrete platelet like spherulitic crystalline aggregates similar to those seen in hydrostatically extruded conduit and sheet made therefrom as seen in coupon B' of FIG. 1B.

In contrast to the structure formed by the method of the invention, polypropylene of the same resin batch was compression molded by a conventional process into sheet and thermoformed at 149 C. (300 F.) and 2.8 kilograms force per square centimeter (40 pounds per square inch) air pressure, to provide comparative samples of biaxially stretched sheet. Microscopic examination by the aforementioned procedure showed substantial spherulite damage at 70 percent, biaxial elongation and the original discrete spherulite structure pattern substantially destroyed by 100 percent biaxial elongation by conventional compression molding techniques. A test coupon from the sheet was notched on a transverse surface and torn. Microscopic examination of the tear surfaces at 100 magnifications showed the absence of an overlapping spherulitic crystalline aggregate structure.

A coupon G was cut from the conduit. The coupon was placed in an oil bath and was heated to a temperature of 165 C. (330 F.) without any restraining pressure being applied and held at temperature for fifteen minutes. The section reverted to about 85 percent of the shape, size and structure it would have had it been cut from the preform used in the manufacture of the conduit. The substantially complete recovery of the spherulitic crystalline aggregate structure indicates that the strain induced in the spherulitic crystalline aggregate structure by the compressive forces employed to elongate the polymer was homogeneously distributed. As a result, the polymer retained its memory and density. The formation of microvoids and the enlargement of existing microvoids was eliminated. It is postulated that the unique spherulitic crystalline aggregate structure wherein the aggregates are radially compressed and circumferentially and axially elongated is responsible for the increase in the circumferential tensile impact strength, the unusual low temperature tensile impact strength, a ratio to the tensile impact strength (referred to as TIS) over the ultimate tensile strength (referred to as UTS) determined by ASTM D1822 S-type specimens which is at least 50 percent greater than that ratio determined for a thermoplastic polymer of the same composition which has been biaxially oriented to the same ultimate strength level by conventional solid state deformations, such as blow molding, tentering and the like, and the retention of the density and reduced permeability of the polymer in the conduit.

The conduit of the invention is fabricated by a solid state hydrostatic extrusion method in which a polymer is heated to a temperature between its 4.64 kilograms force per square centimeter (66 pounds per square inch) heat deflection temperature as determined by ASTM D-648 and about 8 C. (14 F.) below its crystalline melt temperature and is extruded by hydrostatic fluid pressure through an annular orifice at a strain rate which does not exceed 20 seconds$^{-1}$ and preferably is less than 10 seconds$^{-1}$. The polymer is substantially simultaneously elongated in the axial direction and expanded in the circumferential direction by forces which are compressive in nature. The expansion or elongation in the circumferential direction is at least 100 percent and is preferably at least 200 percent. The elongation in the axial direction may be less than 100 percent but it is preferred that the axial elongation be at least 50 percent and most preferably equal to the circumferential elongation.

The temperature to which the polymer is heated for extrusion must be such that the crystalline melt temperature will not be exceeded during extrusion and excessive extrusion pressures resulting in stick-slip extrusion and its attendant overheating problems are not permitted. Broadly, the polymer may be heated to any temperature within the range of its 4.64 kilograms force per square centimeter (66 pounds per square inch) heat deflection temperature and about 8 C. (14 F.) below the crystalline melt temperature. However, a temperature range between about 50 C. (90 F.) and 18 C. (32 F.) below the crystalline melt temperatures is preferred but the most preferred range is between 30 C. (54 F.) and 18 C. (32 F.) below its crystalline melt temperature. The temperature range is dependent upon the polymer, the extrusion rate and the reduction ratio. By way of example, the broad temperature ranges, the preferred temperature ranges and the most preferred temperature ranges at which some polymers may be extruded in the method of the invention are shown in Table I, below.

includes a mandrel and means for lubricating and cooling the extrudate.

The die and mandrel-head are spatially and coaxially aligned within the container assembly. The surface of the die and the surface of the mandrel-head form the walls of an annular orifice having a converging conical entrance; a cylindrical inlet or sealing zone; an expansion zone having converging walls, a converging cross-sectional area and a diverging geometry and a cylindrical outlet or sizing zone. The sealing zone has an outside diameter which is smaller than the outside diameter of the preform. As the preform is extruded, initially the cross-sectional area of its wall is reduced by about 5 percent and axial elongation begins. The preform enters the expansion zone and is circumferentially elongated, i.e. the outside and inside diameters of the preform are increased. At the same time, because of the converging walls and the converging cross-sectional area of the orifice, the wall of the preform continues to be reduced in cross-sectional area until it passes through the exit of the expansion zone into the sizing zone. The extruded preform or extrudate in the sizing zone is cooled to prevent recovery and shrinkage of the polymer. The extrudate is lubricated and cooled as it passes into the receiving assembly. The lubrication and cooling assures the production of a conduit having wall surfaces which are smooth and substantially wrinkle-free. The wall is concentric and of substantially uniform thickness.

In the hydrostatic extrusion of the thermoplastic polymer in the solid state whereby an elongated, expanded, concentric, substantially uniform thick-walled conduit is produced, it is necessary to maintain sufficient constant extrusion pressure in the container assembly and to prevent lateral and axial movement of the tooling. To maintain the constant extrusion pressure, it is necssary to effectively seal the hydrostatic fluid in the container assembly while allowing a film of the hydrostatic fluid to be extruded along the preform surfaces to provide the lubricity needed for extrusion. An effective seal is obtained by providing a preform having a cross-sectional area of the wall which is about 5 percent greater than the cross-sectional area of the sealing zone in the annular orifice and a converging conical entrance to the sealing zone. When extrusion begins, the outside surface of the preform contacts the surface of the outside wall

TABLE NO. I

| | Extrusion Temperatures | | | | | |
|---|---|---|---|---|---|---|
| | Broad Range | | Preferred Range | | Most Preferred Range | |
| High Density | | | | | | |
| Polyethylene | 71C.(160F.) | 129C.(265F.) | 71C.(160F.) | 109C.(247F.) | 104C.(220F.) | 109C.(247F.) |
| Polypropylene | 102C.(216F.) | 162C.(324F.) | 102C.(216F.) | 152C.(306F.) | 121C.(250F.) | 152C.(306F.) |
| Polyester | 154C.(310F.) | 217C.(423F.) | 154C.(310F.) | 207C.(405F.) | 188C.(370F.) | 207C.(405F.) |
| Nylon 6,6 | 221C.(430F.) | 242C.(468F.) | 221C.(430F.) | 232C.(450F.) | 221C.(430F.) | 232C.(450F.) |

The thermoplastic polymer preform is fabricated on a hydrostatic extrusion press. The press may be a batch, semi-continuous or continuous press. In any event, the press is comprised of a supporting structure and tooling. The tooling is comprised of a pressure means which provides the extrusion pressure; clamping means for maintaining alignment of the tooling; a container assembly in which a polymer preform is placed for extrusion which assembly includes a die, a mandrel-head and sealing means to retain the extrusion pressure; and a receiving assembly in which the extrudate is received, lubricated and cooled after extrusion, which assembly of annular orifice as it enters the conical entrance and is guided into the sealing zone. The outside surface of the preform remains in contact with the surface of the outside wall of the annular orifice thereby making an effective seal which prevents leakage of hydrostatic fluid from the container assembly and at the same time allows a film of the fluid to be extruded on the surfaces of the preform to provide lubricity between the surfaces of the preform and the walls of the orifice.

The extrudate is lubricated and cooled by a second fluid, such as air, in the receiving assembly. The fluid is applied to the inner surface of the extrudate and acts as a cushion between the extrudate and the tooling in the receiving assembly thereby preventing damage to the surfaces of the extrudate due to friction. The fluid also prevents wrinkling of a thin-walled extrudate and undue thickening of a heavy-walled extrudate due to the elimination of frictional drag. If desired, additional fluid may be applied to the outer surface of the extrudate for cooling.

A hydrostatic fluid blow-out, caused when one side of the preform continues to flow while an adjacent section of the preform does not flow as well causing uneven extrusion and introducing a defect in the extrudate, can occur near the end of the extrusion of the preform. The blow-out can be prevented by terminating the extrusion of the preform before the rear portion of the preform enters the sealing zone, inserting a second preform into the press with its front end contiguous with the rear portion of the original preform and continuing the extrusion. The extrudate can be removed concurrently with the insertion of a new billet.

It is possible to continuously constrain anneal, i.e. under sufficient pressure to suppress recovery of the polymer, and heat stabilize the extrudate in the press by heating the preform to a temperature near the upper limit of the temperature range and extruding the preform at a low extrusion rate and by using a long sizing zone.

A high hydrostatic compressive stress state may be increased in the deformation zone by using a longer sizing zone with a higher friction related pressure drop.

By using the combination of the above techniques, it is possible to extrude a split preform to produce a split conduit suitable for heat flattening into a thermoplastic polymer sheet. It is also within the scope of this invention to produce thick thermoplastic polymer sheet by slitting and heat flattening the extruded conduit. Any means, such as a heat knife or slitter well known in the art, can be used to slit the conduit. The slit conduit can be heat flattened by clamping it in a restraining device such as press platens which are heated to a temperature which is between 16 C. (30 F.) and 44 C. (80 F.) below its crystalline melt temperature. A suitable pressure is applied to the polymer during heating. The polymer is held at temperature and pressure for between one to twenty minutes depending upon the initial temperature and thickness of the polymer, for example a 0.16 centimeter (1/16 inch) thick polypropylene sheet at a temperature of 24 C. (75 F.) inserted between the press platens at a temperature of 129 C. (265 F.) and held at a pressure of 14.06 kilograms force per square centimeter (200 pounds per square inch) is heated to 143 C. (290 F.) and is held for five minutes. The sheet may be cooled in the press or may be removed and cooled between metal plates.

The sheet produced as described above retains substantially the same morphology and properties of the conduit. The sheet also exhibits excellent drawability.

The polymer sheet may be solid state thermally formed by known techniques, for example stamping or using pressurized gas with the use of a plug assist being optional and the like. The temperature to which the polymer is heated must be between 11 C. (20 F.) and 44 C. (80 F.) and preferably 16 C. (30 F.) to 22 C. (40 F.) below the crystalline melt temperature of the polymer.

Products produced by solid state thermal treatment are useful articles in many fields, for example refrigerator door liners, freezer food containers, stamped automobile hoods, luggage, and the like. In any article produced by such processes, the portion of the article which undergoes a minimum amount of deformation, i.e. less than 50 percent, will retain substantially the same morphology and properties of the sheet from which it is produced. Of course, the portion of the article subjected to maximum deformation may not retain the same morphology.

It also has been found that a substantially non-oriented semi-crystalline thermoplastic homopolymer which contains particles of a filler can be processed into a conduit and sheet and subsequently an article of manufacture by the processes previously described. An article of manufacture produced as described above is novel in itself since it will have a matrix which is an oriented crystalline structure. Heretofore, such orientation of the structure has not been possible with solid state high draw ratio stretch orientation processes, for example, tentering, blow molding and other known stretching processes. Such processes, while orienting the structure also damage areas of the thermoplastic polymer by producing voids in the matrix adjacent to the particles of the filler or enlarging existing microvoids thereby adversely affecting the properties of the finished product.

The biaxially oriented filled crystalline thermoplastic polymer products produced by the prior art solid state processes mentioned above do not have a tensile impact strength which is 5 times and an ultimate tensile strength which is $1\frac{3}{4}$ times that of an unoriented polymer of the same composition. Nor do such products have a ratio of tensile impact strength to ultimate strength (TIS/UTS) which is at least 50 percent greater than that ratio determined for a semi-crystalline thermoplastic polymer of the same composition which has been biaxially oriented to the same ultimate tensile strength level by conventional solid state deformations, for example blow molding, tentering and the like. The voids around the particles of the filler adversely affect the appearance, stiffness and density of the product.

A hydrostatic fluid suitable for use in the hydrostatic extrusion of a thermoplastic polymer is a fluid which has the required high temperature properties to resist degradation at extrusion temperature and which is insoluble in and will not react with the thermoplastic polymers. Such oils can be castor oil, silicone oils, synthetic oils, and various mineral and vegetable oils. It is presently preferred to use silicone oils.

The thermoplastic polymers processed in the method of the invention may also contain additives, such as flame retardants, liquid or solid colorants and fillers, such as talc, mica, silica and the like and elastomeric particles.

By a filled thermoplastic polymer we mean a polymer which contains up to about 60 weight percent of a material inert to the polymer and which is in the form of discrete particles or short fibers with length over diameter ratios not greater than five and which will modify the properties of the polymer or reduce the material and processing costs of the polymer. The inert material can be inorganic, for example talc, calcium carbonate, clay, silica and the like, and includes such materials as colorants and flame retarders.

By a substantially non-oriented semi-crystalline thermoplastic polymer preform, we mean a solid or hollow billet or plug formed from a polymeric melt which is fabricated into the desired shape by a process, such as extrusion, compression molding or injection molding. A minor amount of orientation may occur in the polymer preform during processing, however the amount of orientation is insufficient to cause any substantial improvement in the properties of the polymer. As noted previously the polymer can contain a filler.

It is within the scope of this invention to produce single-layered and multilayered conduits from single-layered and multilayered preforms produced by conventional plasticating methods.

The oriented thermoplastic polymer conduit of the invention may be produced in a batch extrusion process using an apparatus as shown, by way of example only, in FIGS. 2 and 3. FIG. 2 is a cross-sectional view in elevation of a vertical hydrostatic extrusion press 10 shown at the start of the extrusion process. FIG. 3 is a cross-sectional view of the extrusion press 10 at the finish of the extrusion process.

The hydrostatic extrusion press 10 comprises a cylindrical outer casing 11 having threaded open ends 12 and 13, a first hydraulic pressurizing means 14 and a second hydraulic pressurizing means 15, a billet container assembly 16 and an extrudate receiving assembly 17 aligned in spaced relationship coaxially with said outer casing 11.

Since pressurizing means 14 and 15 are identical, only means 14 will be described. The pressurizing means 14 is a hydraulic apparatus comprising a cylinder 18 defining an annular chamber 19 with an axial bore 20. A hollow cylindrical piston 21 is positioned in chamber 19 whereby force is transmitted to a cylindrical plug 30 in the billet container assembly 16. Pressure is applied to the piston 21 from a source (not shown) through piping assembly 22.

The assembly 16 includes a cylindrical shell 23 coaxial within outer casing 11. The shell 23 has cylindrical outer surface 24 and a generally cylindrical inner surface 25. A vent 23a is provided in the shell 23 to vent pressure from cavity 26 during extension. The inner surface 25 defines an axial cavity or bore 26 which is divided into a first cylindrical section 27, an intermediate cylindrical section 28 and a third section 29. The first section 27 has a greater cross-sectional area than the intermediate section 28. A generally cylindrical plug 30 having the shape shown has generally parallel upper and lower surfaces 31 and 33, respectively, and a projection 32 extending downwardly from the lower surface 33. The lower surface 33 rests on and is contiguous with the piston rod 21. Extension 32 provides means to center the plug 30 on the piston rod 21. An O-ring 30c in groove 30b of wall 30a provides a friction means for keeping assembly 16 together after it has been assembled and during subsequent heating and insertion into the press 10. The upper surface 31 is provided with a cylindrical projection 34 generally U-shaped in cross-section as shown. A hollow cylindrical piston 36 comprised of metallic wall 37 having an outer surface 38 and an inner surface 39 defining an axial cavity 39a, is supported by plug 30 as shown. A circular elastomer seal washer 40 provides a seat for cylindrical piston head 42 having generally parallel upper and lower surfaces 43 and 44, respectively and also seals hydrostatic fluid 51 into the cavity 39a. A solid projection 45 extending downwardly from surface 43 provides means for centering piston head 42. A sealing O-ring 46 and a support ring 47 generally triangular in cross-section on shoulder 48 of the hollow piston 36 provide sealing means to prevent leakage of fluid 51. The piston 36 is supported on the upper surface 31 of the plug 30. The hydrostatic fluid 51 fills the cavity 39a of the intermediate section 28 and piston 36 and provides means for transmitting pressure to a cylindrical thermoplastic polymer billet 53 in the assembly 16. During extrusion, a very thin film of the hydrostatic fluid 51 is extruded on the surfaces of the billet 53 to thereby provide lubrication for extrusion. The third section 29 is the die of the apparatus 10 and is comprised of a converging conical entrance 54a, generally cylindrical axial land surface 54, a generally conical diverging wall surface 55 and a generally cylindrical axial land surface 56 substantially parallel to the land surface 54. The land surface 56 may be any length sufficient to aid in setting the extrudate. The diameter of land surface 54 is smaller than the diameter of land surface 56. A mandrel head 57 having a recessed base surface 58, a cylindrical lower portion 59 and a conical upper portion 60 tapering into an elongated cylindrical nose portion 61, is positioned axially within the annulus formed by the die 29. The nose portion 61 is of a size such that when inserted into the bore 53a of the billet 53, an interference fit is produced which is sufficiently strong to keep the mandrel head 57 in position while assembly 16 is being assembled and to maintain the position of the mandrel head 57 during subsequent heating and insertion into the press 10. The outside surface 53b of the billet 53 contacts land surface 54 to thereby form a seal which prevents leakage of hydrostatic fluid 51 during subsequent heating and assembly of the apparatus 10. The surface of die 29 and surface of the mandrel head 57 are spaced a desired distance apart to form an annular orifice or extrusion zone 57a which has a generally converging conical entrance 54a and three zones: a sealing zone 57b formed by the annular cylindrical land surface 54 and the surface of cylindrical nose 61 respectively, a conical expansion zone 57c (FIG. 3) having a converging cross-sectional area formed by diverging wall surface 55 and the surface of conical portion 60, respectively, and a cylindrical sizing zone 57d formed by the land surface 56 and the surface of portion 59. The transition zones t between the surfaces of the sealing zone 57b and the expansion zone 57c and the sizing zone 57d on the die and mandrel-head respectively are provided with curved surfaces having predetermined radii to provide smooth transition areas between any two zones. The angle α that the diverging wall surface 55 makes with the axis of the press 10 may be between 45° and 15° and the angle β that the surface of conical portion 60 makes with the axis of press 10 may vary between 50° and 20°. The angle α and the angle β are chosen so that diverging wall surface 55 and the surface of conical section 60 will meet if extended, i.e. the annular orifice formed by these surfaces is generally converging and has a converging cross-sectional area while being diametrically diverging. By extruding a thermoplastic polymer billet through the annular orifice shaped as described, the billet is substantially simultaneously expanded circumferentially and elongated axially. It is preferred that the angle α be about 30° and the angle β be about 40°. The billet 53 has a diameter which is slightly larger than the diameter of surface 54. When extruded, the outer surface of the billet 53 contacts surface 54 to form a seal which holds the hydrostatic fluid 51 in the assembly 16 to maintain extrusion pressure but at the same time allows a thin film of fluid 51 to be extruded on the surface of the billet 53 to thereby provide lubrication during extrusion. As the billet 53 enters the zone 57c, it is substantially simultaneously expanded circumferentially and elongated axially and flows to the sizing zone 57d. It is possible to vary the axial elongation of the thermoplastic polymer while keeping the circumferential expansion constant by varying the distance between the conical surface of the mandrel-head and the wall surface 55.

The extrudate receiving assembly 17 includes an outer shell 63 coaxially within and spaced from casing 11 and a cylindrical hollow mandrel 62 coaxially within shell 63. The mandrel 62 has an open lower end and an open upper end 64 and 65, respectively, an inner surface 66 defining a cylindrical bore 67 and an outer surface 68. A shoulder 69 and a plurality of radial orifices 70 extending from inner surface 66 to outer surface 68 are formed in lower end 64. The upper end 65 has a greater cross-sectional area than the remainder of the bore 67 and is provided with threads 71. Outer shell 63 has an open lower end 72 and an open upper end 73, an outer surface 76 and a generally cylindrical inner surface 74 defining a generally cylindrical bore 75. The inner surface 74 has an upper portion 74a and a lower portion 74b. A shoulder 78 is formed on end 72. A plurality of radial orifices 79 extend from the lower surface 74b to the outer surface 76. The upper portion 74a is contiguous with the outer surface 68. The lower portion 74b and outer surface 68 are spaced apart to provide a chamber 82 into which the polymer is extruded.

The mandrel 62 is separated from the mandrel head 57 by a grooved washer 83, shown in FIG. 5. A plurality of radial grooves 84 communicate with the orifices 70 to provide uninterrupted passageways between the bore 67 and the chamber 82.

A circular bearing plate 85 having an outer diameter equal to the diameter of the outer shell 63 and an axial opening having a diameter equal to the diameter of the upper end 65 of the mandrel is contiguous with the ends 74a and 73, respectively. A slotted washer 86, shown in FIG. 4, is inserted between bearing plate 85 and piston 21' in the hydraulic cylinder 15. A hollow plug 87 and pipe assembly 88 are attached to the mandrel 62 as shown whereby a lubricating and/or cooling fluid may be introduced into the assembly 17. The plug 87 is spaced a distance from piston rod 21' to provide a passage for the lubricating and/or cooling fluid.

To extrude, a semi-crystalline thermoplastic polymer billet 53, for example isotactic polypropylene is inserted into the shell 23 so that the outer surface 53b of the billet 53 contacts the land surface 54b. The nose 61 of the mandrel-head 57 is inserted into the bore 53a of the billet 53 to make a tight fit. Piston 36 and seal parts 46 and 47 are inserted into section 28. A quantity of a hydrostatic fluid 51, for example castor oil, is poured into the sub-assembly. The sub-assembly is placed in an oven and is heated to a temperature which is between the 4.64 kilograms force per square centimeter (66 pounds per square inch) heat deflection temperature and 8 C. (14 F.) below the crystalline melt temperature of the polymer, for example in the case of polypropylene, the temperature is 129 C. (265 F.). Piston head 42 and seal washer 40 are preheated to the same temperature. When at the desired temperature, piston head 42 and washer 40 are inserted into the bottom portion of piston 36. Plug 30 and O-ring 30b also heated to the desired temperature and protrusion 34 is inserted into piston 36 thereby forming assembly 16. The heated assembly 16 is lowered into the casing 11 and is fitted to be contiguous with hydraulic cylinder 14. Assembly 17 is also preheated and is then lowered into casing 11 and is aligned to be contiguous with assembly 16. The mandrel 62 and mandrel head 57 are aligned as shown. Hydraulic cylinder 15 is screwed into place in the open upper end 13. The pipe assembly 88 is placed in position and is connected to a fluid, for example pressurized air which is introduced into the assembly 17. Hydraulic pressure of about 633 kilograms force per square centimeter (9000 pounds per square inch) is applied by pressurizing means 15 which clamps the press together with $26.6 \times 10^4$ N (30 tons of force) and prevents lateral and axial movement of the mandrel head 57 and other tooling in the press during extrusion. Simultaneously, hydraulic pressure is applied to piston 21 in cylinder 14 which in turn transmits the pressure to plug 30 and hollow piston 37 and pressurizes the fluid 51. Initially, the fluid 51 and the billet 53 are compressed by the force generated in cylinder 14. When the billet 53 and fluid 51 are fully compressed to a pressure of about 520 kilograms force per square centimeter (7,400 pounds per square inch gage) or higher, extrusion begins. The pressure remains relatively constant throughout the extrusion time. As noted above, during extrusion a portion of the hydraulic fluid 51 forms a thin film between the surfaces of the billet 53 and the surfaces of the mandrel head 57 and the die 29, respectively, to provide lubrication for the billet as it is being extruded. A lubricating and/or cooling fluid, preferably air at a desired pressure, for example 2.81 to 6.33 kilograms force per square centimeter (40 to 90 pounds per square inch gage), is fed into the chamber 82 through bore 67 and radial orifices 70. The air forms a flowing film or cushion between the extrudate and the mandrel surface to lubricate the extrudate. The fluid flows along the surface 68, around the extrudate and along surface 74 to radial orifices 79 to cool the extrudate. The fluid then flows along outer surface 76 through the slots 86a in washer 86 and along space between plug 87 and the pressurizing means 15 passes and out of the apparatus through the top of pressurizing means 15. The use of the lubricating and/or cooling fluid assures a smooth substantially wrinkle-free surface and a substantially uniformly thick wall article. After a time, for example about one minute, the billet 53 has been extruded and the hydraulic pressure in the hydraulic cylinders 14 and 15 is relieved. Hydraulic cylinder 15 is removed from the press 10. The assembly 17 and the extrudate are removed from the press 10. A portion of the billet remains unextruded and is retained on the mandrel head 57. The extrudate is separated from the unextruded portion by slitting with any conventional known cutting tool, such as a slitter knife.

Figure 6:
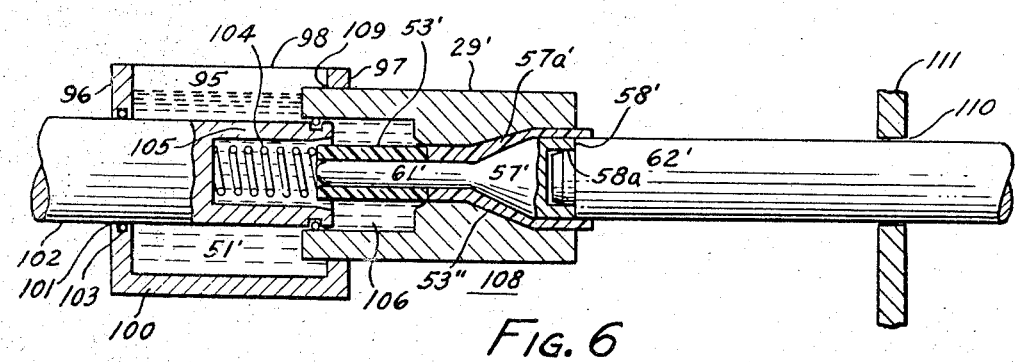
FIG. 6 is a schematic view in cross-section of a second embodiment of an apparatus which may be used in a semi-continuous process for hydrostatically extruding a semi-crystalline thermoplastic polymer preform.
Figure 7:
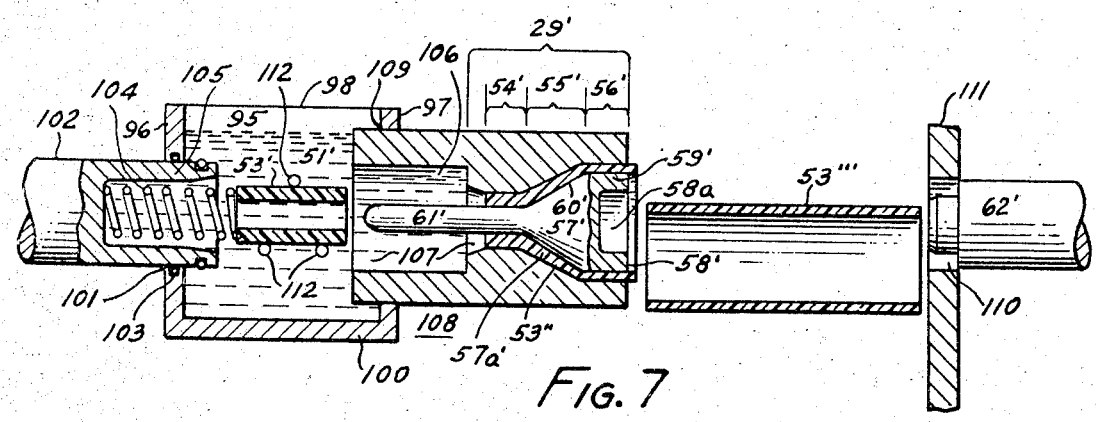
FIG. 7 shows the apparatus of FIG. 6 after the thermoplastic polymer preform has been extruded.
Figure 8:
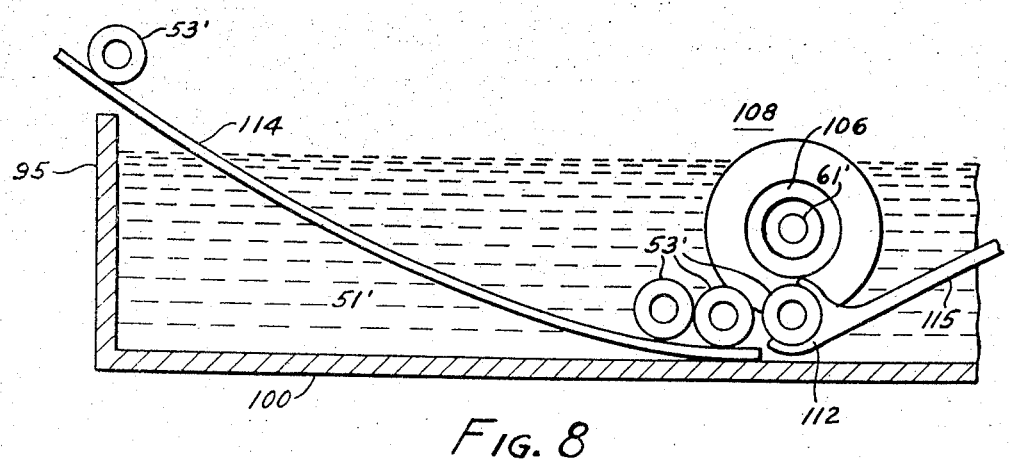
FIG. 8 shows a cross-sectional view of a portion of a heating tank which is used in the apparatus shown in FIG. 6.

While we have shown a batch process, it is also possible to produce the tubular product of the invention by a semi-continuous process using an apparatus such as shown by way of example in FIGS. 6, 7 and 8.

FIG. 6 is an elevation view in cross-section of a press in which a polymer billet is ready to be extruded. FIG. 7 shows the same apparatus as FIG. 6 in which the polymer billet has been extruded and is being ejected from the apparatus. FIG. 8 is an elevation view in cross-section of the fluid tank showing several billets being heated prior to being charged into the apparatus.

The extrusion apparatus includes an outer support structure (not shown), a generally rectangular, tank 95 with an open top and bounded by two side walls 96 and 97, two end walls 98 and 99 (not shown), and a bottom 100. A hydrostatic and lubricating fluid 51' which is also used to heat billet 53' fills the tank 95. The fluid 51' is heated by internal or external conventional means, such as a heating coil (not shown), to a temperature which is between the 4.64 kilograms force per square centimeter (66 pounds per square inch) heat deflection temperature and 8 C. (14 F.) below the crystalline melt temperature of the polymer. Piston 102 is fully movable through opening 101 in wall 96. A seal 103 prevents leakage of hot fluid. One end (not shown) of piston 102 is attached to and activated by hydraulic means. A springloaded cavity 104 in end 105 guides the billet 53' into the rear or pressure chamber portion 106 of axial cavity 107 in die assembly 108. The forward portion of die assembly 108 is a die 29' comprised of a first axial land section 54', a second axial land section 56' and a diverging section 55' connecting the first and second land sections 54' and 56'. Die assembly 108 is mounted in an opening 109 in wall 97. A mandrel head 57' supported by mandrel 62' is axially positioned within cavity 107. The mandrel head 57' has a recessed base surface 58', a generally cylindrical lower portion 59', a generally diverging conical upper portion 60' and an elongated nose 61'. The lower portion 59' and the diverging upper portion 60' and the portion of the nose 61' in cooperation with die 29' define an orifice 57a' which has converging walls but has a generally diverging geometry. The partially extruded billet 53" holds the mandrel head 57' in place during ejection of the product and while heated billet 53' is being placed in position to be extruded. A projection on the front face of mandrel 62' fits into the recess 58a to form a male-female fit whereby any movement of the mandrel head 57' is virtually eliminated. The other end (not shown) of the mandrel 62' is attached to a hydraulic cylinder (not shown). The mandrel 62' is freely movable through an opening 110 in stripper plate 111. The extrudate 53''' is stripped from the mandrel 62' when the mandrel 62' is withdrawn through opening 110 and is rejected from the apparatus. The billet 53' is shown in the fingers 112 of a manipulator (not shown). FIG. 8 is a partial view in cross-section of the tank 95. A sloping ramp 114 as shown allows billet 53' to be fed into the hot fluid 51'. The arm 115 and fingers 112 of the manipulator may be any type well known in the art.

FIG. 6 shows a billet 53' in pressure chamber 106. Pressure is applied to the billet 53' by piston 102 through hydrostatic fluid 51'. At first, the billet 53' is compressed until a pressure is reached at which the billet 53' begins to be extruded through orifice 57a' onto the mandrel 62'. The billets 53' and 53" are elongated substantially simultaneously circumferentially and axially. As noted previously, the expansion in the circumferential direction is at least 100% and preferably is at least 200 percent. The axial elongation may be less than the circumferential expansion but it is preferred that the axial elongation be at least 50 percent and preferably 100 percent of the circumferential expansion.

Although a hollow billet and a mandrel head having an elongated nose have been shown, the use of a solid billet and a mandrel head with a sharp needle-like nose and mandrel-heads of various shapes and sizes are well within the scope of this invention. In all cases the billet must be extruded in the solid state and be substantially simultaneously elongated in both circumferential and axial directions with the circumferential expansion being 100 percent and preferably 200 percent.

As explained previously, the circumferential and axial elongation of the thermoplastic polymer billet are controlled by the converging cross-sectional area and the diverging geometry of the annular orifice through which the billet is extruded. In all extrusions, the increase of the inside and outside diameters of the billet to the conduit must be sufficient to expand the medium circumference of the polymer by at least 100 percent and preferably 200 percent.

As noted above, a portion of the press in which the billet, hydrostatic fluid and mandrel-head are assembled, is heated to a temperature within the range of about 4.64 kilograms force per square centimeter (66 pounds per square inch) heat deflection temperature to 8 C. (14 F.) below the crystalline melt temperature of the polymer. The crystalline melt temperature of a polymer is that temperature at which the polymer melts and is no longer crystalline. The crystalline melt temperature varies for each polymer, therefore the temperature to which each thermoplastic polymer is heated prior to extrusion also varies. The thermoplastic polymer is extruded at a pressure and a strain-rate commensurate with good extrusion practices which will prevent surface tearing, loss of dimensional control and melting of the thermoplastic polymer. In extrusion, the temperature, pressure, strain-rate and degree of elongation are interdependent, therefore if three of the parameters are specified the fourth is fixed. The maximum extrusion rate is a function of the thermoplastic polymer being extruded, the temperature at which extrusion occurs and the degree of elongation of the thermoplastic polymer. The extrusion rate may be expressed as the average strain rate which is defined as the product of the circumferential and axial elongation divided by the time required for the thermoplastic polymer to pass through the expansion zone. As an example, the highest strain rate observed for a successful extrusion of an isotactic polypropylene hollow billet which is 2.54 centimeters (1 inch) in outside diameter and 12.7 centimeters (5 inches) long and has a wall thickness of 0.67 centimeter (0.266 inch), at a temperature of 113 C. (235 F.) into a conduit which is 5.08 centimeters (2 inches) outside diameter, 17.78 centimeters (7 inches) long and having a wall thickness of 0.14 centimeter (0.055 inch) with a circumferential expansion coefficient of 2.6 and an axial elongation coefficient of 1.9, was 8 $\sec^{-1}$. On a practical basis, it is possible to extrude an isotactic polypropylene preform or billet into a conduit having a diameter of 40.64 centimeters (16 inches) at a strain rate of 6.7 $\sec^{-1}$ to yield a throughput of about 10,884 kilograms (24,000 pounds) per hour. The thermoplastic polymer is extruded over a generally conically-shaped mandrel head through an annular orifice formed by the outer surface of the mandrel head and the surface of the die. While the mandrel-head and die have generally diverging geometries, the annular orifice formed by their diverging surfaces has a converging cross-sectional area. The polymer is thus substantially simultaneously expanded circumferentially and elongated axially resulting in a conduit which has a larger outside diameter, a greater length and a wall thickness smaller in cross-sectional area than the starting billet. The divergent geometry of the annular orifice controls the circumferential expansion or elongation while the convergence of the surfaces of the orifice, i.e. the converging cross-sectional area, controls the axial deformation or elongation. Such elongations may be varied independently to obtain desired circumferential and axial properties. Stating this relationship in terms of the billet and product geometry, the increase in the median circumference of the billet to the median circumference of the article defines the circumferential deformation while the reduction of the cross-sectional area of the billet wall to that of the conduit or extrudate controls the axial deformation. By median circumference we mean the circumference which divides the cross-sectional area of either the billet or conduit in half. By median diameter we mean the diameter of the median circumference. An elongation coefficient is obtained by dividing the extruded dimension by the original unextended dimension.

Whenever tensile impact strengths are shown such strength has been determined by ASTM D1822 short specimen and ultimate tensile strength is determined by ASTM D638 unless otherwise stated.

A comparison of the ultimate tensile strength and tensile impact strength of conduits fabricated by the method of the invention and consisting essentially of polypropylene, polyethylene or nylon 6,6 and conduits fabricated from the same resin lots by conventional plasticate extrusion method was made. The results of the tests are shown in Table II (metric units) and Table IIA (English units), below:

strength of 387 kilograms force per square centimeter (5,100 pounds per square inch), and, a tensile impact strength of 3.55 joules per square centimeter at 24 C. (19 foot pounds per square inch at 75 F.).

The rods were divided into billets having a length of 12.7 centimeters (5 inches) and were drilled to produce an axial bore of 1.2 centimeters (0.468 inch). A billet was placed in the billet container assembly and 69 milliliters (2.33 fluid ounces) of castor oil were poured into the assembly. The straight 1.27 centimeter (0.5 inch) diameter tip of a mandrel head was wedged into place in the bore of the billet. An orifice having converging walls and a converging cross-sectional area and a diverging diameter having an entrance of 1.27 centimeters (0.5 inch) internal diameter and 2.51 centimeters (0.99 inch) external diameter and an exit of 5.08 centimeters (2.0 inches) internal diameter and 5.32 centimeters (2.096 inches) external diameter was formed by the surfaces of the mandrel head and the die, respectively.

TABLE NO. II

Comparison of Properties of Thermoplastic Conduits Made by Plasticating and Solid State Hydrostatic Extrusion

|  | MOPLEN D004W Polypropylene | | MARLEX 5003 Polyethylene | | POLYPENCO NYLON 101 Nylon 6/6 | |
| --- | --- | --- | --- | --- | --- | --- |
|  | Prior Art | Solid State | Prior Art | Solid State | Prior Art | Solid State |
| Ultimate Tensile (C)* | 387 | 935(2.5) | 274 | 464(2.55) | 844 | 1561(2.56) |
| Strength (Kfg/cm$^2$) (L)** | 380 | 788(1.7) | 260 | 492(2.15) | 795 | 1322(2.15) |
| Tensile Impact |  |  |  |  |  |  |
| Strength (C)* | 4.6 | 77(2.5) | 6.7 | 83(2.55) | 15*** | 90(2.65)*** |
| (Joules/cm$^2$) (L)** | 2.5 | 57(1.7) | 5.0 | 74(2.15) | 12*** | 96(2.15)*** |

*Circumferential Elongation Coefficient
**Axial Elongation Coefficient
***At Equilibrium with Atmospheric Relative Humidity

TABLE NO. IIA

Comparison of Properties of Thermoplastic Conduits Made by Plasticating and Solid State Hydrostatic Extrusion

|  | MOPLEN D004W Polypropylene | | MARLEX 5003 Polyethylene | | POLYPENCO NYLON 101 Nylon 6/6 | |
| --- | --- | --- | --- | --- | --- | --- |
|  | Prior Art | Solid State | Prior Art | Solid State | Prior Art | Solid State |
| Ultimate Tensile (C)* | 5,500 | 13,300 (2.5) | 3,900 | 6,600 (2.55) | 12,000 | 22,200 (2.56) |
| Strength (psi) (L)** | 5,400 | 11,200 (1.7) | 3,700 | 7,000 (2.15) | 11,300 | 18,800(2.15) |
| Tensile Impact |  |  |  |  |  |  |
| Strength (C)* | 22 | 365 (2.5) | 32 | 395 (2.55) | 72*** | 427 (2.65)*** |
| (ft-lbs/in.$^2$) (L)** | 12 | 270 (1.7) | 352 | 59*** (2.15) | 457 (2.15)*** |  |

*Circumferential Elongation Coefficient
**Axial Elongation Coefficient
***At Equilibrium with Atmospheric Relative Humidity

ILLUSTRATIVE EXAMPLES

Illustrative examples of polymer compositions which can be processed by the method herein described to produce conduits having improved properties are shown below. All the polymers were compression extruded in the apparatus shown in FIGS. 2 and 3. The angles $\alpha$ and $\beta=$ were kept constants at 30° and 40°, respectively.

EXAMPLE I

Isotactic polypropylene rods of Novamont Corporation Moplen D004W homopolymer produced by melt extrusion and machining and having an outside diameter of 2.54 centimeters (1 inch) were obtained. The polymer had a density of 0.909, a crystallinity of 68.3%, a crystalline melt temperature of 168 C. (335 F.), a melt flow index of 0.4 dg. per minute, an ultimate tensile The billet container assembly was placed in an oven and was held for about 160 minutes to heat all the parts and materials in the assembly to a temperature of 129 C. (265 F.). The assembly was removed from the oven and placed in the previously described batch extrusion apparatus and the extrusion apparatus assembled for extrusion. The pressure applied to the billet through the castor oil was increased from 0 to 600 kilograms force per square centimeter (0 to 7900 pounds per square inch) at which pressure the billet was extruded through the orifice into the extrudate receiving assembly. In this example, the extrudate was not lubricated or cooled by a fluid introduced into the extrudate chamber. The polymer did recover somewhat, resulting in thickening of the wall and decreasing the length of the product. However, no evidence of wrinkling was seen and the wall had a uniform thickness which did not vary more than plus or minus 10 percent the length or circumference of the product. The conduit had a length of 13.9 centimeters (5.5 inches) and had an outside diameter of 4.94 centimeters (1.945 inches) and an inside diameter of 4.76 centimeters (1.875 inches) and a wall thickness of 0.089 centimeter (0.075 inch). A length of polymer about 5.08 centimeters (2.0 inches) remained in the billet container assembly. The wall thickness was about 1.8 percent of the outside diameter. The circumferential elongation was 2.6 which is 160 percent and the axial elongation was 2.6 or 160 percent.

Circumferential and axial tensile and tensile impact test specimens were cut from the conduit. The results of the tests are shown below:

|  | Ultimate Tensile Strength | Modulus of Elasticity | Tensile Impact Strength at 24C. (75F.) |
|---|---|---|---|
| Circumferential |  |  |  |
| (psi) | 10,900 | 32.9 × 10$^5$ |  |
| (Kgf/cm.$^2$) | 766 | 0.20 × 10$^5$ |  |
| (Ft.lbs/In.$^2$) |  |  | 180 |
| (Joules/cm.$^2$) |  |  | 38 |
| Axial |  |  |  |
| (psi) | 13,400 | 3.2 × 10$^5$ |  |
| (Kfg/cm$^2$) | 963 | 0.23 × 10$^5$ |  |
| (Ft.lbs/In.$^2$) |  |  | 310 |
| (Joules/cm.$^2$) |  |  | 65 |

The oriented circumferential ultimate strength of 766 kilograms force per square centimeter is 1.9 times the unoriented circumferential ultimate tensile strength of 387 kilograms force per square centimeter. The oriented circumferential tensile impact strength of 38 joules per square centimeter at 24 C. is 8.2 times greater than the circumferential tensile impact strength of 4.6 joules per square centimeters at 24 C. of an unoriented conduit made by a conventional plasticating method.

Samples of the conduit were polished and etched and examined by techniques previously described in these specifications. The microstructure was comprised of platelet or wafer-like spherulitic crystalline aggregates when viewed on a surface radial to the plane of the conduit. When viewed on transverse surfaces the microstructure showed relatively thin lamellae elongated circumferentially and axially and oriented in the plane of the conduit.

EXAMPLE II

Rods of Valox 310, a General Electric resin of polybutylene terephthalate, having a length of 12.7 centimeters (5 inches) and an outside diameter of 2.54 centimeters (1 inch) were obtained. The polymer had a published ultimate tensile strength of 563 kilograms force per square centimeter (8,000 pounds per square inch) at yield, an impact strength of 0.403 joules per centimeter at 24 C. (0.9 foot pounds at 75 F.) on a notched Izod impact specimen.

The rods were divided into billets having a length of 12.7 centimeters (5 inches) and were drilled to produce an axial bore of 1.27 centimeters (0.5 inch). A billet was placed in the billet container assembly and 69 milliliters (2.33 fluid ounces) of castor oil were poured into the assembly. A mandrel-head was force-fit into place in the bore of the billet. An annular orifice having an entrance of 1.27 centimeters (0.5 inch) internal diameter and 2.51 centimeters (0.99 inch) external diameter and an exit of 5.08 centimeters (2.0 inches) internal diameter and 5.32 centimeters (2.096 inches) external diameter was formed by the surfaces of the mandrel head and the die, respectively. The mandrel had a diameter of 5.08 centimeters (2 inches).

The billet container assembly was placed in an oven and was held for about 200 minutes to heat all the parts and materials in the assembly to a temperature of 192 C. (375 F.). The assembly was removed from the oven and placed in the previously described batch extrusion apparatus which was then completely assembled for extrusion. Pressure, applied to the billet through the castor oil, was increased from 0 to 281 kilograms force per square centimeter (0 to 4000 pounds per square inch) at which pressure the billet began to be extruded through the orifice into the extrudate receiving chamber. Pressure was kept substantially constant at 281 kilograms force per square centimeter (4000 pounds per square inch) during extrusion. In this example, the extrudate was lubricated and cooled by air introduced into the extrudate receiving chamber at 3.5 kilograms force per square centimeter (50 pounds per square inch). Visual examination of the extrudate did not elicit any evidence of wrinkling on the wall surface. The wall thickness was substantially uniform and did not vary more than plus or minus 3.5 percent the length of the article. The conduit had a length of 13.97 centimeters (5.5 inches) and had an outside diameter of 5.26 centimeters (2.07 inches) and an inside diameter of 4.1 centimeters (1.98 inches) and a wall thickness of 0.12 centimeters (0.046 inch). The circumferential elongation was 2.55 or 155 percent and the axial elongation was 2.00 or 100 percent.

Circumferential and axial tensile and tensile impact test specimens were cut from the conduit. The results of the tests are shown below:

|  | Ultimate Tensile Strength | Modulus of Elasticity | Tensile Impact Strength at 24C (75F) |
|---|---|---|---|
| Circumferential |  |  |  |
| (psi) | 15,500 | 3.4 × 10$^5$ |  |
| (Kgf/cm.$^2$) | 1090 | 0.24 × 10$^5$ |  |
| (Ft.lbs./In.$^2$) |  |  | 449 |
| (Joules/cm.$^2$) |  |  | 94 |
| Axial |  |  |  |
| (psi) | 15,200 | 3.5 × 10$^5$ |  |
| (Kgf/cm.$^2$) | 1069 | 0.25 × 10$^5$ |  |
| (Ft.lbs./In.$^2$) |  |  | 414 |
| (Joules/cm.$^2$) |  |  | 87 |

The oriented, circumferential ultimate tensile strength of 1090 kilograms force per square centimeter is more than 1.9 times the published unoriented ultimate tensile strength of 563 kilograms force per square centimeter and the oriented circumferential tensile impact strength of 94 joules per square centimeter at 24 C. is more than ten times the estimated unoriented tensile impact strength of 9.0 joules per square centimeter at 24 C.

EXAMPLE III

A polyamide, Polypenco Nylon 101 (Nylon 6,6) in the form of rods having an outside diameter of 2.54 centimeters (1 inch) were obtained from Polymer Corporation. The polymer had an ultimate tensile strength of 633 to 844 kilograms force per square centimeter at 24 C. (9,000 to 12,000 pounds per square inch at 75 F.), a modulus of elasticity of 2,8000 kilograms force per square centimeter (400,000 pounds per square inch), a tensile impact strength of 18.9 to 35.7 joules per square centimeter (90 to 170 foot pounds per square inch), an Izod impact strength of 0.258 to 0.515 joules per centimeter at 23 C. (0.5 to 1.0 foot pounds per inch at 75 F.).

The rods were divided into billets having a length of 12.7 centimeters (5 inches) and were drilled to produce an axial bore of 1.27 centimeters (0.5 inch). A billet was placed in the billet holder assembly and 69 milliliters (2.33 fluid ounces) of castor oil were poured into the assembly. A mandrel head was wedged into place in the bore of the billet. An annular orifice having an entrance of 1.27 centimeters (0.5 inch) internal diameter and 2.51 centimeters (0.99 inch) external diameter and an exit of 5.08 centimeters (2.0 inches) internal diameter and 5.32 centimeters (2.096 inches) external diameter was formed by the surfaces of the mandrel head and the die, respectively. The mandrel had a diameter of 5.08 centimeters (2.0 inches).

The billet container assembly was placed in an oven and was held for about 230 minutes to heat all the parts and materials in the assembly to a temperature of 221 C. (430 F.). The assembly was removed from the oven and placed in the previously described batch extrusion apparatus and the extrusion apparatus assembled for extrusion. The pressure applied to the billet through the castor oil was slowly increased from 0 to 457 kilograms force per square centimeter (0 to 6500 pounds per square inch) at which pressure the billet was extruded through the orifice into the extrudate receiving chamber. The extrusion strain rate was about 2 sec$^{-1}$. In this example, the extrudate was not lubricated or cooled by a fluid introduced into the extrudate chamber. The polymer did recover somewhat, resulting in thickening of the wall and decreasing the length of the product. However, no evidence of wrinkling was seen and the wall had a uniform thickness which did not vary more than plus or minus 10 percent the length or circumference of the product. The conduit had a length of 14 centimeters (5.5 inches) and had an outside diameter of 5.245 centimeters (2.065 inches) and an inside diameter of 5.01 centimeters (1.972 inches) and a wall thickness of 0.102 centimeters (0.046 inch). The wall thickness was 2.2 percent of the outside diameter. The circumferential elongation was 2.56 or 156 percent and the axial elongation was 2.15 or 115 percent.

Circumferential and axial tensile and tensile impact test specimens were cut from the conduit. The results of the tests are shown below:

| | Ultimate Tensile Strength | Modulus of Elasticity | Tensile Impact Strength 24C.(75F.) | Tensile Impact Strength −45C. (−50F.) |
|---|---|---|---|---|
| Circumferential | | | | |
| (psi) | 26,300 | 4.3 × 10$^5$ | | |
| (Kgf/cm.$^2$) | 1850 | 0.30 × 10$^5$ | | |
| (Ft.lbs/In.$^2$) | | | 426.5 | 109.5 |
| (Joules/cm.$^2$) | | | 90 | 23 |
| Axial | | | | |
| (psi) | 18,800 | 3.7 × 10$^5$ | | |
| (Kgf/cm.$^2$) | 1322 | 0.26 × 10$^5$ | | |
| (Ft.lbs/In.$^2$) | | | 457 | 155.5 |
| (Joules/cm.$^2$) | | | 96 | 33 |

The oriented circumferential ultimate tensile strength of 1850 kilograms force per square centimeter is 2.2 times the unoriented circumferential ultimate tensile strength of 844 kilograms force per square centimeter. The oriented circumferential tensile impact strength of 90 joules per square centimeter at 24 C. is six times greater the unoriented circumferential tensile impact strength of 15 joules per square centimeter at 24 C. of an unoriented conduit made by a conventional plasticating method. The −45 C. tensile impact strength of 23 joules per square centimeter is 25.6 percent of the tensile impact strength of 90 joules per square centimeter at 24 C.

Specimens were removed from both the billet and the conduit and their surfaces prepared for microscopic examination by the techniques previously described. Microscopic examination of the surfaces showed the billet to be comprised of undeformed uniformly distributed spherulitic crystalline aggregates and the conduit to be comprised of radially compressed platelet or wafer-like spherulitic crystalline aggregates circumferentially and axially oriented in the plane of the conduit.

EXAMPLE IV

Extruded Samples of Delrin 100, an E. I. DuPont Corp. homopolymer polyoxymethylene (polyacetal) which were 2.54 centimeters (1 inch) in outside diameter were purchased. The polymer had a published tensile strength of 703 kilograms force per square centimeter (10,000 pounds per square inch), a tensile modulus of 0.32×10$^5$ kilograms force per square centimeter (4.5×10$^5$ pounds per square inch), a tensile impact strength of 8.4 joules per square centimeter at 24 C. (40 foot pounds per square inch at 75 F.).

The rods were cut into lengths of 12.7 centimeters (5 inches) and a 1.27 centimeters (0.5 inch) diameter bore was drilled through the specimens. A billet was placed in the billet container assembly together with 69 milliliters (2.33 ounces) of castor oil. A mandrel head was force-fit into the bore of the billet. The mandrel head had a bore diameter of 5.08 centimeters (2 inches). The assembly was placed in an oven and to heat the parts and billet held for 160 minutes to a temperature of 129 C. (265 F.). The assembly was placed into the extrusion press and the press was completely assembled. The mandrel which had a diameter of 5.08 centimeters (2 inches) was placed contiguous with the base of the mandrel head and a clamping force of 27,200 kilograms (30 tons) was applied to the apparatus to keep the mandrel rigid and the prevent vertical or lateral movement of the mandrel head during extrusion. Air at a pressure of 3.5 kilograms force per square centimeter (50 pounds per square inch) was introduced into the extrudate chamber. The extrusion pressure was 499 kilograms force per square centimeter (7100 pounds per square inch). The extrudate had an outside diameter of 5.26 centimeters (2.07 inches), an inside diameter of 5.03 centimeters (1.98 inches) and a uniform wall thickness of 0.11 centimeter (0.045 inch). The wall thickness was about 2.0 percent of the outside diameter, and wall thickness variations were within plus or minus 2.5 percent. The circumferential elongation of the polymer was 2.47 or 147 percent and the axial elongation was 2.1 or 110 percent.

Tensile and tensile impact test specimens were taken from the sheet. The test results are shown below:

|  | Ultimate Tensile Strength | Modulus of Elasticity | Tensile Impact Strength | |
|---|---|---|---|---|
|  |  |  | 24C.(75F.) | −45C. (−50F.) |
| Circumferential |  |  |  |  |
| (psi) | 20,600 | 4.57 × 10⁵ |  |  |
| (Kgf/cm.²) | 1450 | 0.32 × 10⁵ |  |  |
| (Ft.lbs/In.²) |  |  | 348 | 75 |
| (Joules/cm.²) |  |  | 73 | 16 |

The oriented, circumferential ultimate tensile strength of 1450 kilograms force per square centimeter is twice the published unoriented ultimate tensile strength of 703 kilograms force per square centimeter and the oriented circumferential tensile impact strength of 73 joules per square centimeter is 8.7 times the unoriented tensile impact strength of 8.4 joules per square centimeter at 24 C. The −45 C. tensile impact strength of 16 joules per square centimeter is 22 percent of the tensile impact strength of 73 joules per square centimeter at 24 C.

EXAMPLE V

A plurality of extruded rods consisting essentially of Marlex 5003, a Phillips Petroleum Corporation high density polyethylene, were obtained. The rods had an outside diameter of 2.54 centimeters (1 inch). The polymer had a density of 0.95 grams per cubic centimeter, a melt index of 0.3 grams per 10 minutes, an ultimate tensile strength of 232 kilograms force per square centimeter (3,300 pounds per square inch) and a flexural modulus of 11,600 kilograms force per square centimeter (165,000 pounds per square inch). The rods were prepared for extrusion and were extruded by the method of the invention as described in Example I except that the rods were heated to a temperature of 113 C. (235 F.) and were extruded at a pressure of 113 kilograms force per square centimeter (1600 pounds per square inch). The extrudate was cooled by air at a pressure of 3.5 kilograms force per square centimeter (50 pounds per square inch). The extrudate produced was a conduit which had a length of 14 centimeters (5.5 inches), an outside diameter of 5.2 centimeters (2.06 inches), an inside diameter of 5.0 centimeters (1.972 inches) and a wall thickness of 0.11 centimeter (0.044 inch). The wall thickness was 2.11 times the outside diameter. The circumferential elongation was 2.65 or 165 percent and axial elongation was 2.12 or 112 percent.

The results of testing are shown below:

|  | Ultimate Tensile Strength | Impact Tensile Strength | |
|---|---|---|---|
|  |  | 24C.(75F.) | −45C.(−50F.) |
| Circumferential |  |  |  |
| (psi) | 6,630 |  |  |
| (Kgf/cm.²) | 466 |  |  |
| (Ft.lbs/In.²) |  | 352 | 167 |
| (Joules/cm.²) |  | 74 | 35 |
| Axial |  |  |  |
| (psi) | 6,650 |  |  |
| (Kgf/cm.²) | 468 |  |  |
| (Ft.lbs/In.²) |  | 395 | 201 |
| (Joules/cm.²) |  | 83 | 42 |

The circumferential ultimate tensile strength of 466 kilograms force per square centimeter is about one and three quarters times the circumferential ultimate tensile strength of 274 kilograms force per square centimeter and the circumferential tensile impact strength of 74 joules per square centimeter at 24 C. is eleven times greater than the circumferential tensile impact strength of 6.7 joules per square centimeter at 24 C. of an unoriented conduit made by a conventional plasticating method.

The circumferential tensile impact strength of 35 joules per square centimeter at −45 C. was 47 percent of the circumferential tensile impact strength of 74 joules per square centimeter at 24 C.

EXAMPLE VI

A useful article of manufacture which can be made by the process of the invention is a relatively deep freezer food container as shown at 116 in FIG. 9. The container had a diameter of 19.2 centimeters (8 inches) and a depth of 9.6 centimeters (4 inches). The container was made from an isotactic polypropylene described in Example I and which was initially made into a conduit by the process described in Example I. The conduit had a length of 61.0 centimeters (24 inches), an outside diameter of 20.6 centimeters (8.4 inches), an inside diameter of 19.2 centimeters (8 inches), and a wall thickness of 5.1 centimeters (0.20 inch). The conduit was slit by a heat knife. The slit conduit was placed in a heated platen press and was held for 6 minutes at a temperature of 129 C. (265 F.) and under a pressure of 24.4 kilograms force per square centimeter (347 pounds per square inch) to form a heat flattened sheet which was cut into a disc having a diameter of 24.1 centimeters (9.5 inches) and a thickness of 4.83 millimeters (0.20 inch). The disc-shaped sheet and appropriate solid state thermal forming apparatus were heated to a temperature of 149 C. (300 F.) for about 60 minutes in an oven. The apparatus and sheet were removed from the oven and the outer periphery of the sheet was clamped in place in the thermoforming apparatus. Air at a pressure of 2.8 kilograms of force per square centimeter (40 pounds per square inch) was introduced into the apparatus and forced the sheet to be formed into the shape of the cavity in the apparatus. After about 10 minutes, the air pressure in the apparatus was relieved. The container thus formed was removed from the apparatus. The bottom 118 of the container was subjected to a total biaxial draw ratio of 4:1 when compared to the unoriented polymer. A portion of the flange 117 which measured 1.6 centimeters (⅝ inch) not shown) by which the disc was clamped in the apparatus was trimmed from the product. The flange 117 which remained was substantially undeformed and hence was subjected to an average biaxial draw ratio of 2.2 to 1. The side wall 119 of the container was subjected to intermediate draw ratios between 2.2:1 and 4:1. The flange 117 had a thickness of 4.45 millimeters (0.175 inch). In the area immediately beneath the flange, the wall 119 had a thickness of 3.43 millimeters (0.135 inch) about 2.54 centimeters (1 inch) below the flange 117 and 1.9 millimeters (0.075 inch) in the area immediately above the radius 120. The bottom 118 of the container had an average thickness of 1.6 millimeters (0.063 inch). These dimensions indicate that the polymer sheet had excellent drawability and resisted "necking" during processing. For comparison, a 5.8 millimeters (0.23 inch) thick sheet of unfilled substantially non-oriented isotactic polypropylene of the same resin batch was thermoformed into a dish of identical overall dimensions by the same thermoforming process as outlined above. The dish bottom was thinned to 0.53 millimeter (0.021 inch) and therefore was subjected to a biaxial draw ratio of 3.3:1.

The tensile impact strengths and ultimate tensile strengths of the freezer container of the invention compared favorably with the tensile impact strengths and tensile strengths of a conduit produced by the method of the invention as seen in Example I.

Tensile and tensile impact test specimens were cut from the sheet of the invention prior to solid state thermal treatment and also from the bottom of the thermoformed container and from the bottom of a container made from unoriented semi-crystalline thermoplastic polymer sheet prepared from the same polymer by the same solid state thermal treatment process. The results of the tests are shown below:

|  | Average Ultimate Tensile Strength | Total Average Biaxial Draw Ratio | Average Tensile Impact Strength 24C(75F) |
|---|---|---|---|
| Sheet of Invention |  | 2.2 |  |
| (psi) | 11,000 |  | — |
| (Kgf/cm$^2$) | 773 |  | — |
| (Ft.lbs/In$^2$) | — |  | 280 |
| (Joules/cm$^2$) | — |  | 59 |
| Dish Bottom from Oriented Sheet |  | 4.1 |  |
| (psi) | 18,100 |  | — |
| (Kgf/cm$^2$) | 1,305 |  | — |
| (Ft.lbs/In$^2$) | — |  | 380 |
| (Joules/cm$^2$) | — |  | 80 |
| Dish Bottom from Non-Oriented Sheet |  | 3.3 |  |
| (psi) | 17,400 |  |  |
| (Kgf/cm$^2$) | 1,255 |  |  |
| (Ft.lbs/In$^2$) |  |  | 207 |
| (Joules/cm$^2$) |  |  | 43 |

EXAMPLE VII

Another article of the invention is a refrigerator freezer door liner, shown at 121 in FIG. 10. The liner is made from a filled substantially non-oriented thermoplastic homopolymer Profax 68F-5-4 which is a polypropylene homopolymer containing 40 weight percent calcium carbonate filler and made by the Hercules Corporation, 910 Market Steet, Wilmington, Del. 19899. The properties of the melt extruded homopolymer at 23 C. (74 F.) are listed below:

Ultimate Tensile Strength
  274 kilograms force per square centimeter (3900 pounds per square inch)

Flexural Modulus
  23,700 kilograms force per square centimeter (337,000 pounds per square inch)

Elongation at Fracture
  41%

Tensile Impact Strength
  1.9 Joules per centimeter squares (9.2 foot pounds per square inch) at 23 C. (74 F.)
  1.5 Joules per centimeter squares (7.0 foot pounds per square inch) at −45 C. (−50 F.)

Notched Izod Impact
  0.5 Joules per centimeter (1.0 foot pounds per inch) at 23 F. (74 F.)
  1.2 Joules per centimeter (0.4 foot pounds per inch) at −45 F. (−50 F.)

The polymer has a melt index of 0.3 to 0.6 at 230 C. (446 F.) and crystalline melting point of 168 C. (335 F.). A billet having an outside diameter of 10.16 centimeters (4.0 inches), an inside diamter of 6.99 centimeters (2.75 inches) and 25.4 centimeters (10 inches) long was hydrostatically extruded at 143.3 C. (290 F.) in a large press of appropriate size by the technique described in Example I. Dow Corning 3000 Silicone fluid manufactured by Dow Corning Corporation, Midland, Mich. 48640 was used as the hydrostatic fluid.

The conduit which had an outside diameter of 20.8 centimeters (8.2 inches), an inside diameter of 19.2 centimeters (8.0 inches) and 61 centimeters (24 inches) long was air cooled as it was extruded into the extrudate zone. The circumferential elongation and the axial elongation were essentially the same 2.5 or 250 percent which is greater than 100 percent deformation. The conduit was slit with a heat knife and was heat flattened as described in Example VI.

Specimens to determine the ultimate tensile strength and tensile impact strength were cut from the sheet. Since the draw ratio is the same in the circumferential and axial directions, the average properties are reported and are the same in either direction. The results of the tests are shown below:

|  | Average Ultimate Tensile Strength | Average Biaxial Draw Ratio | Average Tensile Impact Strength | |
|---|---|---|---|---|
|  |  |  | 24C.(75F.) | −45C.(−50F.) |
| (psi) | 8900 | 2.5 |  |  |
| (Kgf/cm$^2$) |  |  |  |  |
| (Ft.lbs/In$^2$) |  |  | 86.4 | 63.4 |
| (Joules/cm$^2$) |  |  |  |  |

The sheet can be thermoformed by the techniques described in Example VI to form the article in FIG. 10.

A coupon taken from the flange 122 show that the properties were essentially the same as those of the sheet from which it was produced. The flange 122 had a thickness of 0.254 centimeters (0.10 inches).

We claim:

1. A rigid conduit having a substantially uniform wall thickness which does not vary circumferentially and axially by more than plus or minus 10 percent, and which is from about 0.5 percent to about 6.25 percent of the outside diameter, the thickness being not less than 0.079 centimeter (1/32 inch) in conduits having an outside diameter of between 2.54 centimeters (1 inch) and 7.62 centimeters (3 inches), comprising at least one layer of at least one oriented semi-crystalline thermoplastic polymer characterized by a density which is at least equal to the density of the unoriented polymer and by having a microstructure substantially devoid of process induced microvoids and microfibrils and comprised of radially compressed, discrete, platelet-like spherulitic crystalline aggregates which are oriented in the plane of the conduit wall; the conduit having a circumferential tensile impact strength at −45 C. (−50 F.) which is not less than 20 percent of its circumferential tensile impact strength at 24 C. (75 F.), and having a circumferential tensile impact strength at 24 C. which is at least five times and a circumferential ultimate tensile strength which is at least one and three quarters that of a corresponding conduit of the same polymer in an unoriented state and a ratio of tensile impact strength over ultimate tensile strength which is at least 50% greater than that ratio determined for a conventional biaxially oriented thermoplastic conduit.

2. The conduit as claimed in claim 1 in which the outside diameter is between about 5 centimeters (1.9 inches) and 63.5 centimeters (25 inches).

3. The conduit as claimed in claim 1 in which the outside diameter is between about 20 centimeters (8 inches) and 41 centimeters (16 inches).

4. The conduit as claimed in claim 1 in which the thickness of the wall is between about 0.5 to 3.0 percent of the outside diameter of the conduit.

5. The conduit as claimed in claim 1 in which the thickness of the wall is between about 1.0 to 2.0 percent of the outside diameter of the conduit.

6. The conduit as claimed in claim 1 in which the length of the conduit is at least 7.6 centimeters (3 inches).

7. The conduit as claimed in claim 2 in which the length of the conduit is between 30 centimeters (12 inches) and 244 centimeters (96 inches).

8. The conduit as claimed in claim 1 in which the thickness and concentricity of the wall does not vary by more than 5 percent.

9. The conduit as claimed in claim 1 in which the thickness and concentricity of the wall does not vary in more than plus or minus 2.5 percent.

10. The conduit as claimed in claim 1 wherein the thermoplastic polymer is a semi-crystalline polyolefin.

11. The conduit as claimed in claim 10 wherein the polyolefin is high density polyethylene.

12. The conduit as claimed in claim 1 wherein the polyolefin is isotactic polypropylene.

13. The conduit as claimed in claim 1 wherein the thermoplastic polymer is a polyamide.

14. The conduit as claimed in claim 13 wherein the polyamide is nylon 6/6.

15. The conduit as claimed in claim 13 wherein the polyamide is nylon 6/10.

16. The conduit as claimed in claim 13 wherein the polyamide is nylon 11.

17. The conduit as claimed in claim 1 wherein the thermoplastic polymer is a polyacetal.

18. The conduit as claimed in claim 1 wherein the thermoplastic polymer is a polyester.

19. The conduit as claimed in claim 18 wherein the polyester is polybutylene terephthalate.

20. The conduit of claim 1 wherein the oriented crystalline thermoplastic polymer contains at least 10 weight percent particulate filler.

21. The conduit of claim 20 wherein the thermoplastic polymer is isotactic polypropylene.

22. The conduit of claim 20 wherein the filler is talc.

23. The conduit of claim 20 wherein the filler is calcium carbonate.

24. The conduit of claim 20 wherein the filler is mica.

25. A method for producing the conduit of claim 1 which comprises compressively extruding a preform of a substantially non-oriented semi-crystalline thermoplastic polymer in a solid state with a hydrostatic fluid through an extrusion zone whereby the preform is expanded and elongated substantially simultaneously circumferentially at least 100 percent and axially at least 50 percent to form a conduit, while lubricating the surface of the polymer with the hydrostatic fluid.

26. The method as claimed in claim 25 wherein the circumferential elongation of the thermoplastic polymer is at least 200 percent.

27. The method as claimed in claim 25 wherein the axial elongation is essentially equal to the circumferential elongation.

28. The method as claimed in claim 25 in which the thermoplastic polymer is heated to a temperature which is between the 4.64 kilograms force per square centimeter heat deflection temperature of the thermoplastic polymer and 8 C. below the crystalline melt temperature of the thermoplastic polymer.

29. The method as claimed in claim 25 wherein the thermoplastic polymer is heated to a temperature which is within a temperature range of 18 C. to 30 C. (32 F. to 54 F.) below the crystalline melt temperature of the thermoplastic polymer.

30. The method as claimed in claim 25 wherein the thermoplastic polymer is a semi-crystalline polyolefin.

31. The method as claimed in claim 30 wherein the polyolefin is isotactic polypropylene.

32. The method of claim 25 in which the polymer preform is split to produce a split conduit.

33. The method of claim 25 comprising the further step of slitting the conduit.

34. The method as claimed in either claim 32 or 25 comprising the further step of heat flattening the conduit to form a sheet product.

35. A rigid sheet having a substantially uniform thickness of at least 0.079 centimeter (1/32 inch) comprising at least one layer of at least one oriented semi-crystalline thermoplastic polymer characterized by a density which is at least equal to the density of the unoriented polymer, and by having a micro-structure substantially devoid of any process induced microvoids and microfibrils and comprised of discrete, platelet-like spherulitic crystalline aggregates which are compressed in a direction transverse to the plane of the sheet and which are planar oriented; and having a tensile impact strength at 24 C. (75 F.) which is at least five times an ultimate tensile strength which is at least one and three quarters that of a corresponding sheet of the same polymer in an unoriented state when tested in the plane of the sheet and the tensile impact strength at −45 C. (−50 F.) which is not less than 20 percent of the tensile impact strength at 24 C. (75 F.) and a ratio of tensile impact strength over ultimate tensile strength which is at least 50 percent greater than the ratio determined for a conventional biaxially oriented thermoplastic polymer sheet.

36. The sheet as claimed in claim 35 wherein the semi-crystalline thermoplastic polymer is a polyolefin.

37. The sheet as claimed in claim 36 wherein the polyolefin is isotactic polypropylene.

38. The sheet as claimed in claim 36 wherein the polyolefin is high density polyethylene.

39. The sheet as claimed in claim 35 wherein the thermoplastic polymer is a polyamide.

40. The sheet as claimed in claim 39 wherein the polyamide is nylon 6/6.

41. The sheet as claimed in claim 39 wherein the polyamide is nylon 6/10.

42. The sheet as claimed in claim 39 wherein the polyamide is nylon 11.

43. The sheet as claimed in claim 35 wherein the thermoplastic polymer is a polyacetal.

44. The sheet as claimed in claim 35 wherein the thermoplastic polymer is a polyester.

45. The sheet as claimed in claim 35 wherein the thermoplastic polymer is polybutylene terephthalate.

46. The sheet of claim 35 wherein the oriented crystalline thermoplastic polymer contains at least 10 weight percent filler.

47. The sheet of claim 46 wherein the thermoplastic polymer is isotactic polypropylene.

48. The sheet of claim 46 wherein the filler is talc.

49. The sheet of claim 46 wherein the filler is calcium carbonate.

50. The sheet of claim 46 wherein the filler is mica.

51. An article of manufacture comprised of at least one oriented semi-crystalline thermoplastic polymer having a thickness of not less than 0.079 centimeters in at least a portion of its contour which portion is characterized by having a microstructure comprised of spherulitic crystalline aggregates compressed transversely to the plane of the portion and biaxially oriented in the plane of the portion, said portion being substantially devoid of stretch oriented microvoids and microfibrils and having a density which is at least equal to the density of the non-oriented polymer and a tensile impact strength which is at least five times and an ultimate tensile strength which is at least 1¾ times that of the corresponding substantially non-oriented thermoplastic polymer melt, a tensile impace strength at −45 C. (−50 F.) which is not less than 20 percent of its tensile impact strength at 24 C. (75 F.), a ratio of tensile impact strength to ultimate tensile strength, determined by ASTM D1822 S-type specimens, is at least 50% greater than the same ratio determined for a conventional biaxially oriented semi-crystalline thermoplastic polymer of the same composition, which polymer has the same ultimate tensile strength level.

52. The article of manufacture of claim 51 wherein the thermoplastic polymer is isotactic polypropylene.

53. The article of manufacture as claimed in claim 51 wherein the oriented semi-crystalline thermoplastic polymer is unfilled.

54. The article of manufacture as claimed in claim 51 wherein the oriented semi-crystalline thermoplastic polymer contains between at least 10 weight percent to 60 weight percent filler.

55. The article of manufacture as claimed in claim 54 in which the filler is talc.

56. The article of manufacture as claimed in claim 54 in which the filler is calcium carbonate.

57. The article of manufacture as claimed in claim 54 in which the filler is mica.

58. A crystalline biaxially oriented thermoplastic polymer product having a thickness of not less than 0.079 centimeter in at least a portion thereof, which portion is characterized by having a microstructure comprised of spherulitic crystalline aggregates compressed transversely to the plane of the portion and biaxially oriented in the plane of the portion, said portion being substantially devoid of stretch oriented microvoids and microfibrils said portion being additionally characterized by having a density at least equal to the density of the non-oriented thermoplastic polymer from which it was made and a tensile impact strength which is at least five times and an ultimate tensile strength which is at least 1¾ times that of a substantially non-oriented thermoplastic polymer of the same composition and a tensile impact strength at −45 C. (−50 F.) which is not less than 20 percent of its tensile impact strength at 24 C. (75 F.) and a ratio of tensile impact strength to ultimate strength (TIS/UTS) as determined by ASTM D1822 S-type specimens, which is at least 50 percent greater than that ratio determined for a conventional biaxially oriented crystalline thermoplastic polymer.

59. The product as claimed in claim 58 wherein the thermoplastic polymer contains between at least 10 weight percent and 60 weight percent filler.

60. The product as claimed in claim 59 wherein the thermoplastic polymer is semi-crystalline polypropylene.

61. The product as claimed in claim 59 wherein the filler is calcium carbonate.

62. The product as claimed in claim 59 wherein the filler is talc.

63. A product in accordance with claims 58 or 59 wherein the product is a conduit.

64. A product in accordance with claims 58 or 59 wherein the product is a sheet.

65. A product in accordance with claims 58 or 59 wherein the product is a stretch-formed product of manufacture.

* * * * *

UNITED STATES PATENT AND TRADEMARK OFFICE
CERTIFICATE OF CORRECTION

PATENT NO. : 4,282,277

DATED : August 4, 1981

INVENTOR(S) : Alfred R. Austen and Darral V. Humphries

It is certified that error appears in the above—identified patent and that said Letters Patent is hereby corrected as shown below:

Col. 6, line 63, after "sheet" insert the word --which--.

Col. 17, line 21, the word "with" should read --within--.

Column 23, Table IIA, second last line under "Marlex 5003 Polyethylene" in column identified as "Prior Art," delete "352" and insert --24--; in column identified as "Solid State" delete "59*" and insert --352--; and second last line under "Polypenco Nylon 101 Nylon 6/6" in column identified as "Prior Art" delete "457" and insert --59*--; and in column identified as "Solid State" add --457--.

Col. 23, line 58, the word "constants" should read --constant--.

Col. 28, line 51, the word "the" should read --to--.

Col. 30, line 51, insert parenthesis before --(not shown)--.

Col. 33, claim 9, line 25, delete "in" and substitute --by--.

Col. 34, claim 34, should read --32 or 33-- and not "32 or 25".

Col. 34, claim 35, line 46, the word "the" should read --that--.

Respectfully submitted,

Signed and Sealed this

Twenty-second Day of December 1981

[SEAL]

Attest:

GERALD J. MOSSINGHOFF

*Attesting Officer*   *Commissioner of Patents and Trademarks*